US011803049B2

(12) United States Patent
Kempf et al.

(10) Patent No.: US 11,803,049 B2
(45) Date of Patent: Oct. 31, 2023

(54) MACHINE VISION SYSTEM AND METHOD WITH STEERABLE MIRROR

(71) Applicant: COGNEX CORPORATION, Natick, MA (US)

(72) Inventors: Torsten Kempf, Aachen (DE); Saul Sanz Rodriguez, Aachen (DE); Pepe Fernandez-Dorado, Aachen (DE); Laurens Nunnink, Simpelveld (NL)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 17/585,809

(22) Filed: Jan. 27, 2022

(65) Prior Publication Data

US 2022/0256087 A1  Aug. 11, 2022

Related U.S. Application Data

(63) Continuation of application No. 17/071,797, filed on Oct. 15, 2020, now Pat. No. 11,240,436, which is a continuation of application No. 16/715,078, filed on Dec. 16, 2019, now Pat. No. 10,812,727.

(51) Int. Cl.
| | | |
|---|---|---|
| *G02B 26/10* | (2006.01) | |
| *G02B 7/182* | (2021.01) | |
| *H04N 23/69* | (2023.01) | |
| *G06V 10/147* | (2022.01) | |

(Continued)

(52) U.S. Cl.
CPC ......... *G02B 26/101* (2013.01); *G02B 7/1827* (2013.01); *G06V 10/147* (2022.01); *G06V 10/225* (2022.01); *G06V 10/245* (2022.01); *H04N 23/69* (2023.01)

(58) Field of Classification Search
CPC .... H04N 5/23296; H04N 5/247; H04N 23/69; H04N 23/90; G02B 7/1827; G02B 26/0816; G02B 26/101; G06K 7/10831; G06V 10/147; G06V 10/225; G06V 10/245

See application file for complete search history.

(56) References Cited

U.S. PATENT DOCUMENTS

| | | |
|---|---|---|
| 4,032,785 A | 6/1977 | Green et al. |
| 4,175,832 A | 11/1979 | Umeki et al. |
| 4,825,068 A | 4/1989 | Suzuki et al. |

(Continued)

FOREIGN PATENT DOCUMENTS

| | | |
|---|---|---|
| CN | 109642820 A | 4/2019 |
| EP | 1630721 A1 | 3/2006 |

(Continued)

OTHER PUBLICATIONS

Moser, Using Bounce Mirrors to Read Codes in Tight Spaces, Jun. 17, 2013, Copyright 2018 Omron Microscan Systems, Inc., 6 pages.

(Continued)

*Primary Examiner* — Jason A Flohre
(74) *Attorney, Agent, or Firm* — Quarles & Brady LLP

(57) ABSTRACT

Systems and methods are provided for acquiring images of objects using an imaging device and a controllable mirror. The controllable mirror can be controlled to change a field of view for the imaging device, including so as to acquire images of different locations, of different parts of an object, or with different degrees of zoom.

20 Claims, 15 Drawing Sheets

(51) Int. Cl.
  *G06V 10/22* (2022.01)
  *G06V 10/24* (2022.01)

(56) References Cited

U.S. PATENT DOCUMENTS

| | | | |
|---|---|---|---|
| 4,939,355 | A | 7/1990 | Rando et al. |
| 5,770,848 | A | 6/1998 | Oizumi et al. |
| 5,979,761 | A | 11/1999 | Wurz et al. |
| 6,053,409 | A | 4/2000 | Brobst et al. |
| 6,086,209 | A | 7/2000 | Miyahara et al. |
| 6,688,525 | B1 | 2/2004 | Nelson et al. |
| 6,856,472 | B2 | 2/2005 | Herman et al. |
| 6,963,375 | B1 | 11/2005 | Lundberg |
| 7,256,834 | B1 | 8/2007 | Sagefalk et al. |
| 7,527,205 | B2 | 5/2009 | Zhu et al. |
| 7,726,573 | B2 | 6/2010 | Gurevich et al. |
| 7,954,719 | B2 | 6/2011 | Zhu et al. |
| 8,027,077 | B2 | 9/2011 | Border |
| 8,134,589 | B2 | 3/2012 | Border et al. |
| 8,164,625 | B2 | 4/2012 | Klawunder |
| 8,322,621 | B2 | 12/2012 | Olmstead |
| 8,608,076 | B2 | 12/2013 | Olmstead |
| 8,646,690 | B2 | 2/2014 | Nunnink et al. |
| 8,668,150 | B2 | 3/2014 | Bombaugh et al. |
| 8,978,979 | B2 | 3/2015 | Bombaugh et al. |
| 9,239,636 | B1 | 1/2016 | S et al. |
| 9,449,211 | B2 | 9/2016 | Detwiler |
| 9,703,115 | B2 | 7/2017 | Schneider |
| 9,710,684 | B2 | 7/2017 | Detwiler |
| 9,854,226 | B2 | 12/2017 | Ko et al. |
| 10,002,271 | B2 | 6/2018 | Olmstead et al. |
| 10,074,191 | B1 | 9/2018 | Reome et al. |
| 10,075,651 | B2 | 9/2018 | Laroia et al. |
| 10,812,727 | B1 | 10/2020 | Kempf et al. |
| 2003/0066949 | A1 | 4/2003 | Mueller et al. |
| 2004/0245227 | A1 | 12/2004 | Grafton-Reed et al. |
| 2008/0128503 | A1 | 6/2008 | Moore et al. |
| 2010/0051695 | A1 | 3/2010 | Yepez et al. |
| 2011/0254967 | A1 | 10/2011 | Filliettaz, III |
| 2012/0261473 | A1 | 10/2012 | Bombaugh et al. |
| 2013/0181051 | A1 | 7/2013 | Olmstead et al. |
| 2013/0200157 | A1 | 8/2013 | Nunnink et al. |
| 2013/0327828 | A1 | 12/2013 | Lawson et al. |
| 2014/0028837 | A1* | 1/2014 | Gao .................. H04N 7/18 348/136 |
| 2014/0097251 | A1 | 4/2014 | Joussen et al. |
| 2014/0124581 | A1 | 5/2014 | Bombaugh et al. |
| 2014/0198185 | A1 | 7/2014 | Haugen et al. |
| 2015/0122890 | A1 | 5/2015 | Olmstead et al. |
| 2015/0310242 | A1 | 10/2015 | Wehrle |
| 2018/0203249 | A1 | 7/2018 | Filhaber |
| 2018/0218224 | A1 | 8/2018 | Olmstead et al. |
| 2018/0324349 | A1 | 11/2018 | Kim |
| 2019/0169008 | A1 | 6/2019 | Houle |
| 2019/0251312 | A1 | 8/2019 | Schneider et al. |
| 2019/0374855 | A1* | 12/2019 | Johnston ............ A63F 13/525 |
| 2020/0059594 | A1* | 2/2020 | Olbrich ............ H04N 5/232125 |
| 2022/0174221 | A1* | 6/2022 | Frischman ............... G06T 7/70 |
| 2022/0267128 | A1 | 8/2022 | Han et al. |

FOREIGN PATENT DOCUMENTS

| | | |
|---|---|---|
| EP | 2380109 B1 | 8/2017 |
| EP | 3839610 A1 | 6/2021 |
| JP | 2006155395 A | 6/2006 |

OTHER PUBLICATIONS

European Patent Office, Extended European Search Report, Application No. 20214296.4, dated May 12, 2021, 8 pages.

* cited by examiner

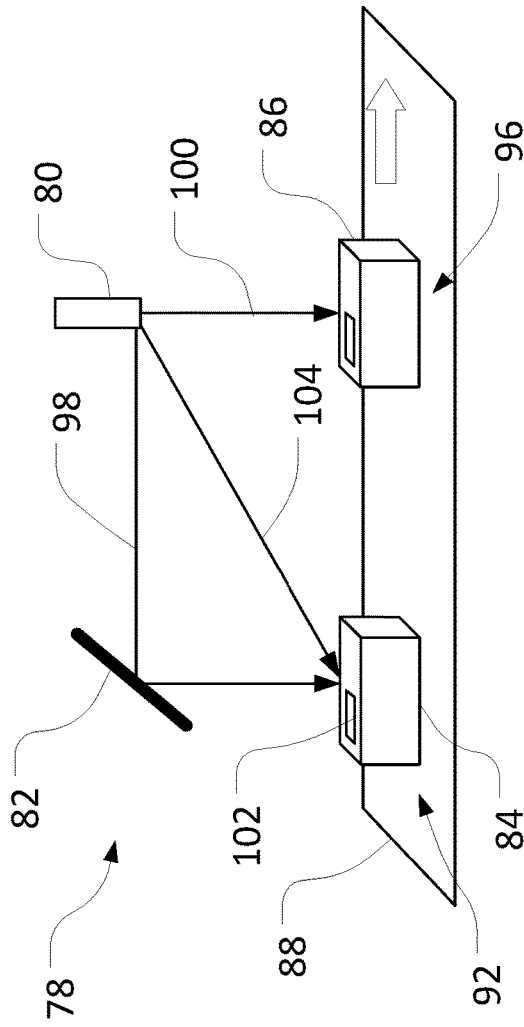
FIG. 4A
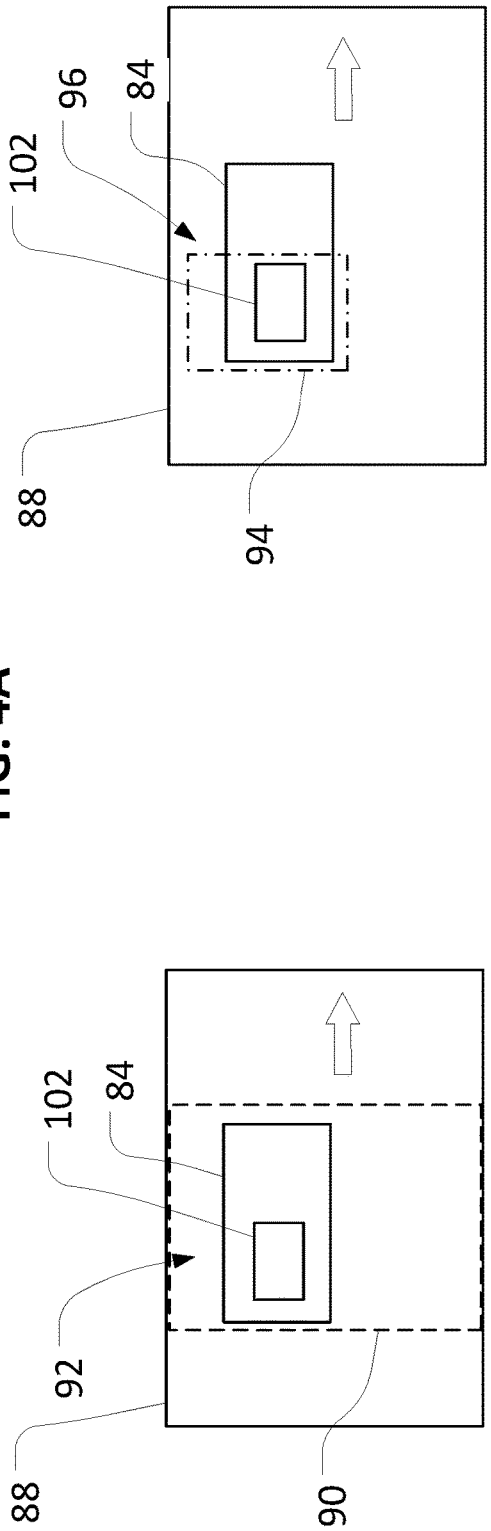
FIG. 4C
FIG. 4B

MACHINE VISION SYSTEM AND METHOD WITH STEERABLE MIRROR

CROSS-REFERENCE TO RELATED APPLICATIONS

This application is a continuation of U.S. patent application Ser. No. 17/071,797 filed Oct. 15, 2020, which is a continuation of U.S. patent application Ser. No. 16/715,078 filed Dec. 16, 2019, and entitled, "Machine Vision System and Method with Steerable Mirror," which is based on, claims priority to, and is hereby incorporated by reference in its entirety.

STATEMENT REGARDING FEDERALLY SPONSORED RESEARCH OR DEVELOPMENT

Not applicable.

BACKGROUND OF THE TECHNOLOGY

The present technology relates to imaging systems, including machine vision systems that are configured to acquire and analyze images of objects or symbols (e.g., barcodes).

Machine vision systems are generally configured for use in capturing images of objects or symbols and analyzing the images to identify the objects or decode the symbols. Accordingly, machine vision systems generally include one or more devices for image acquisition and image processing. In conventional applications, these devices can be used to acquire images, or to analyze acquired images, including for the purpose of decoding imaged symbols such as barcodes or text. In some contexts, machine vision and other imaging systems can be used to acquire images of objects that may be larger than a field of view (FOV) for a corresponding imaging device or that may be moving relative to an imaging device.

BRIEF SUMMARY OF THE TECHNOLOGY

In some applications, including in systems for imaging and decoding barcodes or other symbols, it may be useful to acquire multiple images of a target, including successive images having different fields of view (FOVs) or different degrees of zoom. For example, as an object moves past an imaging device on a conveyor, it may be useful to acquire images of the object at different locations on the conveyor, to acquire images of different sides of the object, or to acquire objects with different degrees of zoom, such as may be useful to analyze a symbol on a relatively small part of the object at large.

Under conventional approaches, multiple images of an object can be acquired in different ways. As one example, in a tunnel application or other context in which images of multiple sides of an object are to be acquired, multiple imaging devices may be arranged with optical axes for image acquisition that are angled differently relative to an expected location of an object. For example, different sets of imaging devices may be angled to acquire images of a front of an object as it enters a tunnel, of the rear of the object as it leaves the tunnel, and of the top and sides of the object as it travels through the tunnel. As another example, a first imaging device can be arranged to acquire a first image of an object at a first location along a conveyor and a second imaging device can be arranged to acquire a second image of an object at a second location further along the conveyor. Or a first imaging device can be arranged to acquire an image of a first portion of an object, and a second imaging device can be arranged to acquire an image of a second portion of the object.

Although conventional approaches can provide useful information, including for identification and decoding of symbols, the installation, calibration, maintenance, and operation of multiple imaging devices may inherently be relatively complex, time consuming, expensive, and subject to error. Embodiments of the disclosed technology can address these and other issues. For example, some embodiments provide systems and corresponding methods in which a controllable (movable) mirror is used to change a field of view of a fixed-location imaging device (e.g., camera) between initial and subsequent images taken by the imaging device. In some embodiments, a controllable mirror can be used in combination with one or more fixed mirrors in order to provide different fields of view or to adjust a zoom of a particular image relative to another. For example, for a single imaging device, a combination of fixed and controllable mirrors can be used to adjust a field of view to different locations on a conveyor or to different locations on (e.g., different sides of) an object, or to provide different degrees of zoom for particular objects or locations. In some embodiments, a combination of fixed and controllable mirrors can be used to adjust a field of view between initial and subsequent images in order to measure dimensions of an object, thereby potentially obviating the need for more complex, e.g., three-dimensional (3D), sensors.

Some embodiments disclosed herein are expressly presented as systems, such as machine vision systems with imaging devices and associated mirrors. Those of skill in the art will recognize that corresponding embodiments (and others) can be executed as methods, such as computer-implemented methods with automated control of image acquisition and, as appropriate, image analysis, according to the capabilities of the associated systems. In this regard, unless otherwise indicated, discussion herein of disclosed systems inherently includes disclosure of corresponding methods that use the disclosed systems to execute the intended functionality. Similarly, those of skill in the art will recognize that embodiments expressly presented herein as methods can be implemented as systems, such as machine vision systems with one or more imaging devices, one or more associated mirrors (including a controllable mirror), and one or more processor devices that are configured to implement one or more operations of the relevant method, including through manipulation of a controllable mirror and corresponding acquisition of images.

Consistent with the discussion above, some embodiments of the technology include an imaging system (or method), such as, for example, a machine vision system, for acquiring images of a first object. An imaging device can include an imaging sensor and a lens arrangement. A first mirror can be configured to be (or can be) tilted relative to at least one axis. A control device can be configured to (or can), as the first object is moved along a direction of travel: using the imaging device, acquire a first image that includes the first object in a first location, the first image being acquired along a first optical path defined by the first mirror and a second mirror; tilt the first mirror relative to the at least one axis to define a second optical path that does not include the second mirror; and using the imaging device, acquire a second image that includes the first object in a second location, the second image being acquired along the second optical path so that the first object is represented in a larger proportion of the second image than of the first image.

Some embodiments of the technology include an imaging system (or method), such as, for example, a machine vision system, for analyzing a symbol included on an object. An imaging device can include an imaging sensor and a lens arrangement. A control device can be configured to (or can): using the imaging device, acquire a first image of the object using a first field of view that is defined by first and second mirrors, with the first mirror in a first orientation, and that provides a first degree of zoom; move the first mirror to a second orientation; and using the imaging device, acquire a second image of the object using a second field of view that is defined by the first and second mirrors, with the first mirror in a second position, and that provides a second degree of zoom that is different from the first effective zoom.

Some embodiments of the technology include a method of (or system for) analyzing a symbol on an object, using an imaging system that includes an imaging device with an imaging sensor and a lens arrangement, a first mirror, and a second mirror. Using the imaging device, a first image of an object can be acquired along a first optical path that includes the first mirror and the second mirror. The first mirror can be moved to define a second optical path that does not include the second mirror. Using the imaging device, a second image of the object can be acquired along the second optical path so that the object is represented in a larger proportion of a second field of view for the second image than of a first field of view of the first image.

To the accomplishment of the foregoing and related ends, embodiments of the technology comprise the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

BRIEF DESCRIPTION OF THE SEVERAL VIEWS OF THE DRAWINGS

FIGS. 4A through 4C are schematic views of still another imaging system (and method) that includes a controllable mirror, in accordance with some embodiments of the technology;

Figure 1A:
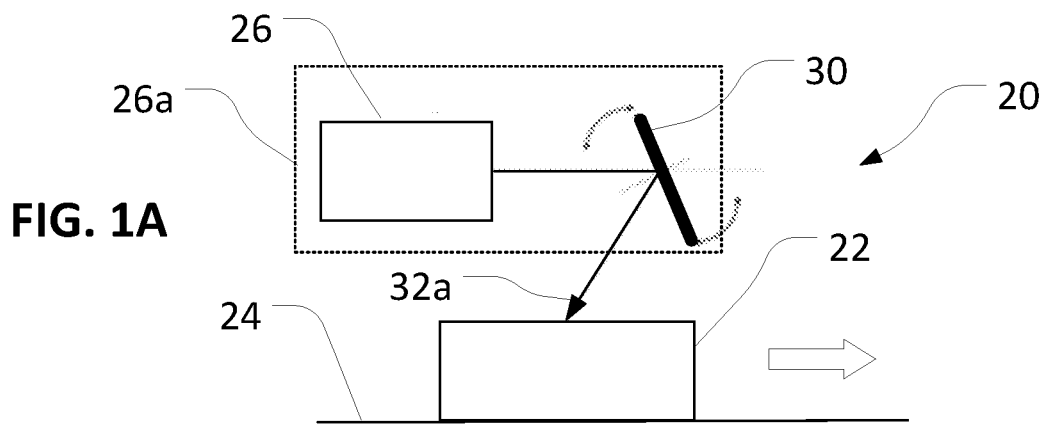
FIGS. 1A-C are schematic views of an imaging system (and method) that includes a controllable mirror, in accordance with some embodiments of the technology.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto, including illustration in the drawings of a particular order of operations for a particular method, are not intended to limit the claimed subject matter to the particular form disclosed. Rather, the intention is to cover all modifications, equivalents, and alternatives falling within the spirit and scope of the claimed subject matter.

In some embodiments, aspects of the disclosure, including computerized implementations of methods according to the disclosure, can be implemented as a system, method, apparatus, or article of manufacture using standard programming or engineering techniques to produce software, firmware, hardware, or any combination thereof to control a processor device, a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Generally, as also noted above, embodiments of the disclosure can include systems and methods for acquiring images of objects using a controllable (movable) mirror. For example, some embodiments can include an imaging device that is configured to selectively acquire images along optical paths that intersect one or more mirrors that can be controlled for movement relative to two degrees of freedom (e.g., for rotation about two perpendicular axes). For example, despite the imaging device being a fixed-location imaging device, the one or more mirrors can be appropriately controlled to direct optical paths for separate images in separate directions, so that images can be acquired by the imaging device with different FOVs. In this regard, for example, some embodiments can include configurations that allow for images to be acquired with different degrees of zoom, with an object occupying different proportions of the respective FOVs, with an object being imaged at different locations (e.g., along a conveyor), with an object being imaged from different sides, or with different parts of an object being otherwise included in the different FOVs. Similarly, some embodiments can allow for acquired images of an object to be used collectively to analyze object dimension or other parameters.

In some embodiments, one or more fixed (i.e., non-controllable) mirrors can be used in some or all of the optical paths that are implemented using one or more controllable mirrors. For example, multiple fixed mirrors can be disposed at different locations relative to a scanning tunnel for a conveyor. A controllable mirror can then be used to define different optical paths for image acquisition via alignment with different permutations of one or more of the fixed mirrors. Thus, images can be obtained, using the mirrors, of different sides of an object as the object passes into, through, or out of the tunnel. In this way, for example, a single imaging device that is configured to acquire images in conjunction with a controllable mirror can replace multiple imaging devices (e.g., as used in conventional tunnel systems). Further, in other embodiments, similar principles can also be applied in non-tunnel applications, and with different potential combinations of controllable or fixed mirrors.

In different embodiments, different types of controllable mirrors can be used. For example, as generally discussed above, some embodiments can use mirrors that are configured to be tilted relative to multiple axes. In this regard, for example, a variety of known approaches can be utilized to control movement of a mirror for image acquisition. For example, some approaches are disclosed in U.S. Published Patent Application No. 2018/0203249 and U.S. Pat. Nos. 4,175,832 and 6,086,209, which are incorporated herein by reference.

Figure 1B:
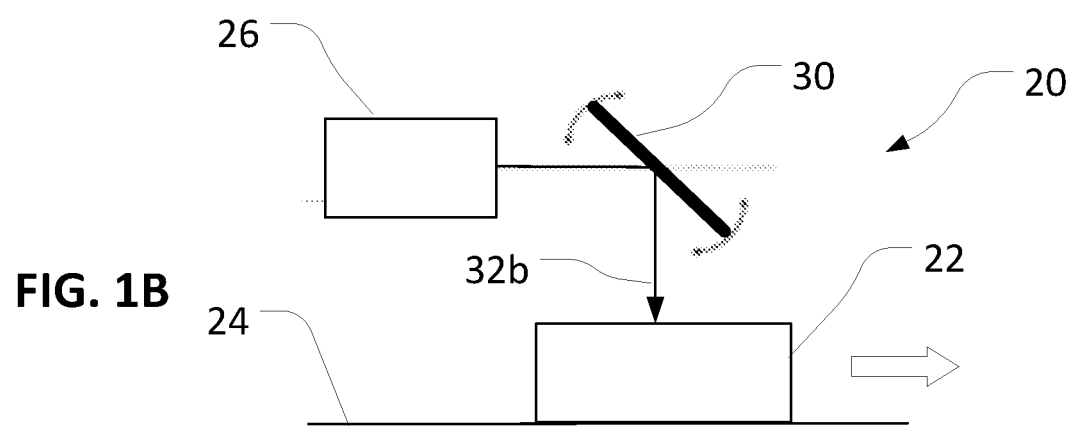
Figure 1C:
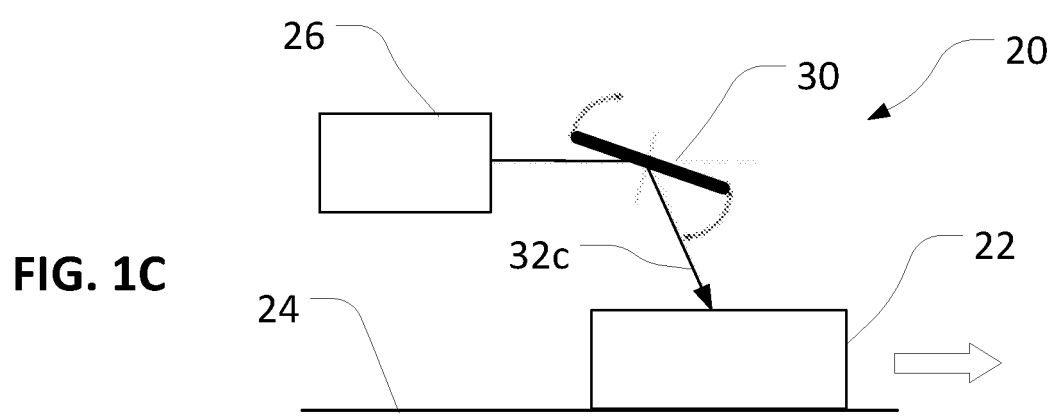

FIGS. 1A through 1C illustrate an example imaging system 20 for use to acquire images of an object 22 (and other objects) on a conveyor 24, such as a conventional conveyor belt system. In the embodiment illustrated, the conveyor 24 is configured to move the object 22 linearly (over time), and with an unchanging (local) direction of travel (i.e., from left to right, as shown). In other embodiments, other configurations are possible, including configurations with conveyors that can move objects non-linearly or in locally changing directions of travel. Correspondingly, those of skill in the art will recognize that the principles discussed herein can generally be adapted without undue experimentation to conveyors of a variety of types. Further, some embodiments of the technology can be used to implement operations relative to objects that are being moved by other means. For example, embodiments discussed relative to movement of objects along a conveyor can be readily adapted by those of skill in the art to operate with user-effected movements, such as may result during pick-and-place operations, during "presentation" mode scanning (in which a user presents an object for scanning by moving the object into a target area), and in various other contexts.

In the illustrated embodiment, the imaging system 20 includes an imaging device 26 that is secured at a fixed location relative to the conveyor 24. Generally, imaging devices as discussed herein, including the imaging device 26, include at least one imaging sensor (e.g., a CCD, CMOS, or other known sensor), at least one lens arrangement, and at least one control device (e.g., a processor device) configured to execute computational operations relative to the imaging sensor. In some embodiments, a lens arrangement can include a fixed-focus lens. In some embodiments, a lens arrangement can include an adjustable focus lens, such as a liquid lens or a known type of mechanically adjusted lens.

In some embodiments, an imaging device can be configured as an image processing device, which can be operated to process images that are acquired by an associated imaging sensor and lens arrangement. For example, an imaging device can be configured as a computing device or other arrangement of modules for decoding symbols in images that are received from an associated imaging sensor. In some embodiments, an imaging device can be configured to communicate image data (e.g., binary pixel values) to a remote processor device (e.g., within a cloud computing or local-network system) for further processing.

In addition to the imaging device 26, the imaging system 20 also includes a mirror 30. In particular, the mirror 30 is a controllable mirror that is configured to be tilted relative to at least one axis. For example, in the embodiment illustrated, the mirror 30 is controllable by a processor device to tilt (i.e., rotate) relative to an axis that extends into the page of FIG. 1A, in alignment with a pivot point of the mirror 30. In other embodiments, other types of controllable movement are possible, including multi-axis movement, as noted above and discussed further below. In some embodiments, the mirror 30 can be controlled by a processor device and associated software (or other) modules that form part of the imaging device 26. In some embodiments, the mirror 30 can be controlled by other devices (not shown), including other devices that are also configured to control operation of the imaging device 26.

In some embodiments, a control device can be configured to operate the imaging device 26 and the mirror 30 based on information relating to the conveyor 24. For example, an actual or virtual encoder (not shown) associated with the conveyor 24 can be configured to provide signals to a processor device of the imaging device 26. Based on the signals from the encoder, the processor device can then control movement of the mirror 30 and acquisition of images by the imaging device 26, including as discussed in further detail below.

As illustrated collectively in FIGS. 1A through 1C, as the object 22 is moved along the direction of travel of the conveyor 24, the imaging device 26 can acquire a series of images of the object, such as a series that includes one image for each of the positions of the object 22 along the conveyor 24 that are illustrated in FIGS. 1A through 1C. In particular, a control device (e.g., a processor device of the imaging device 26) can operate to tilt the mirror 30 between the angular orientations illustrated in FIGS. 1A through 1C, so that images can be acquired of the object 22 for the positions of each of the FIGS. 1A through 1C, with each of the images being acquired along a different optical path 32a, 32b, 32c that is defined by the respective orientations of the mirror 30.

Thus, without necessarily moving the imaging device 26 itself, multiple images can be obtained of the object 22, with each of the images exhibiting a unique FOV. Further, the mirror can be readily returned to a starting orientation (e.g., as in FIG. 1A) for acquisition of images of a subsequent object (not shown). Accordingly, multiple views of the object 22 can be obtained, with corresponding benefits for monitoring and analysis.

In some embodiments, multiple views of the object 22, as facilitated by the controllable mirror 30 can include views of multiple sides of the object 22. For example, an image acquired using a configuration similar to that illustrated in FIG. 1A may sometimes include front and top sides of the object 22, and an image acquired using a configuration similar to that illustrated in FIG. 1C may sometimes include front and back sides of the object 22. Similar approaches can also be utilized in a variety of other implementations, including for each of the other embodiments expressly discussed below, to acquire images of multiple sides of an object, including left and right sides in some cases.

In some embodiments, discrete predetermined orientations of a mirror can be used. For example, in some implementations, the mirror 30 can be tilted between two or more (e.g., three) predetermined angular orientations, so that similar images of different objects can be independently acquired with two or more predetermined FOVs. In some embodiments, mirrors can be moved adaptively, with a particular orientation of a mirror for acquisition of a particular image being determined based on a location or other characteristic (e.g., size) of an object or feature thereof, or on other factors, as appropriate.

In some embodiments, a controllable mirror can be used to track an object along a particular path of travel, so that multiple images can be easily acquired of the object at multiple different locations. For example, the imaging system 20 can be configured to process signals from an encoder and information regarding an initial position of the object 22, such as indicated via a light gate (not shown) or analysis of an initial image, and to thereby determine an expected position of the object 22 along the conveyor 24 at any given time. (Similar principles can also be applied relative to motion not drive by a conveyor.) The mirror 30 can then be controlled, as appropriate, in order to acquire multiple images of the object 22 over time, at multiple different locations along the conveyor 24 (or otherwise). In some embodiments, the mirror 30 can be adjusted in a stepped fashion, and images acquired at discrete intervals along the conveyor 24. In some embodiments, the mirror 30 can be adjusted continuously during image acquisition, such as may allow continuous acquisition of images of the object 22 over time or may mitigate motion blur.

In some embodiments, a controllable mirror can be used to adjust a FOV of a lens for movements of an object that are not caused by a mechanical conveyor. As also noted above, for example, some systems (e.g., similar to the imaging system 20) can be configured to acquire images at different locations based on movements of a human operator. For example, a system similar to the imaging system 20 can be configured to move a controllable mirror in order to capture one or more initial images of an object as an operator carries the object towards a scanning area, then adjust a controllable mirror to acquire subsequent images of the object within the scanning area. In some embodiments, such a system may determine an expected motion of the object based on predetermined operator tasks or bounded imaging areas, prior operator movements, or analysis of initial images of the object or the operator, and then adjust a controllable mirror accordingly for subsequent image acquisition.

In some embodiments, a control device can be configured to adjust a focus of a lens arrangement depending on an orientation of an associated mirror. For example, the processor device of the imaging device 26 can be configured to automatically adjust a focus of the lens arrangement of the imaging device 26 depending on the orientation of the mirror 30 so that an object can be captured with a focused image for multiple FOVs. In this regard, for example, the imaging device 26 may be configured to automatically adjust focus for image acquisition for each of the orientations of the mirror 30 that are shown in FIGS. 1A through 1C (or other orientations). Such adjustments to lens arrangements can generally be made in a variety of known ways, including by electronic control of a liquid lens (not shown), electronic or other control of a mechanically focused lens arrangement (not shown), or otherwise.

In some embodiments, an appropriate focal plane can be predetermined using pre-runtime calibration (e.g., as discussed below). In some embodiments, an appropriate focal plane can be determined more adaptively (e.g., in real time), including as based on information from other sensors (e.g., 3D sensors) or, as also discussed below, from other image acquisition using controllable mirrors.

In some embodiments, focus adjustments can be synchronized with controlled movements of a mirror, so that a relevant lens arrangement is automatically moved into appropriate focus for acquisition of images via the mirror with the mirror at any given orientation. In some embodiments, focus adjustments can be made simultaneously with controlled movements of a mirror, to provide efficient and rapid transitions between FOVs. However, the speed of focus adjustments for some known types of lenses (e.g., liquid lenses) may be an order of magnitude (or more) faster than the speed of adjustments to the orientation of a mirror. Accordingly, some implementations may adjust lens focus before or after adjusting mirror orientation without substantial loss in performance or detriment to user satisfaction.

Further, in some embodiments, the relative speed of focus and mirror adjustments may be orders of magnitude faster than movement of a relevant conveyor. Accordingly, for some implementations, the relatively slow movement of an object along a conveyor (or otherwise) may be a more significant time-limiting factor than the speed of lens or mirror adjustments. In this regard, as also discussed below, lens and focus adjustments may sometimes be made quickly enough, relative to object movement, so that an object can be successively imaged with different lens and mirror configurations while the object is effectively stationary relative to the relevant imaging device.

In the example illustrated in FIGS. 1A through 1C, the mirror 30 is disposed externally to and remotely from the imaging device 26. In other embodiments, other configurations are possible. For example, some configurations can include a controllable mirror that is mounted within a housing of an imaging device, such as is illustrated for the mirror 30 and an example imaging device 26a (see FIG. 1A).

Figure 2:
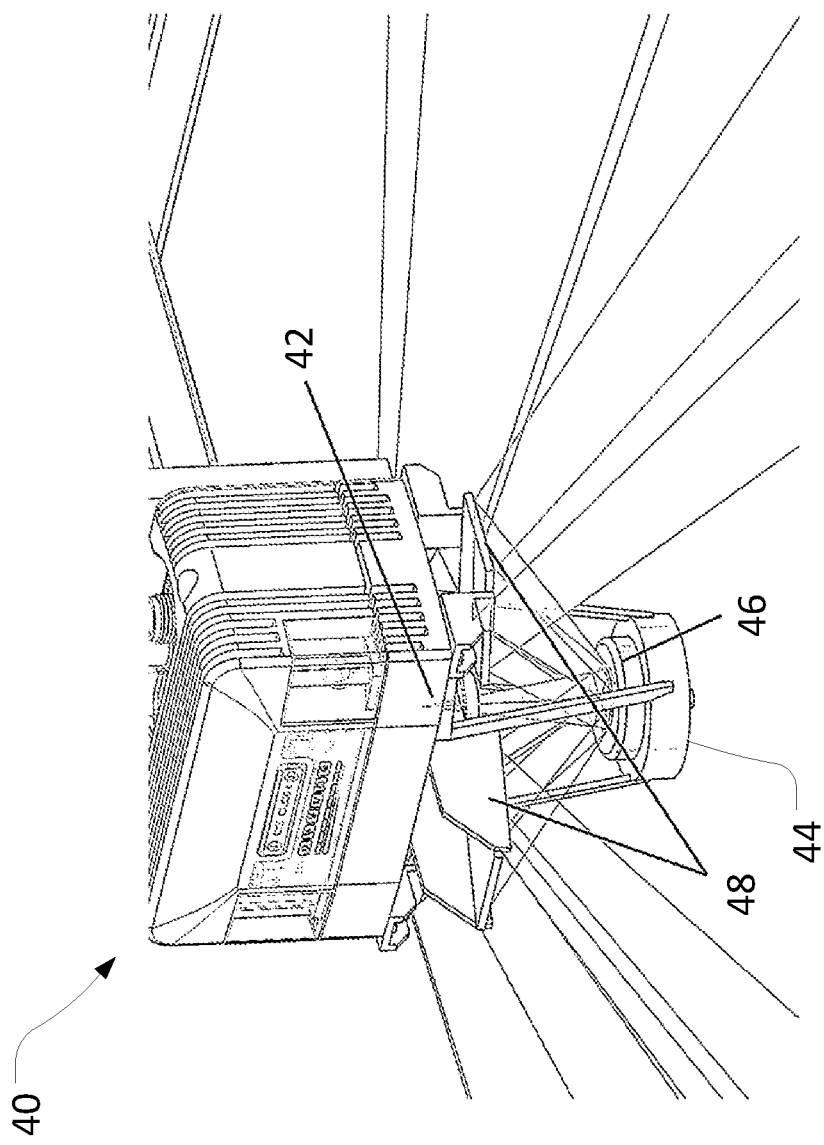
FIG. 2 is an isometric view of an imaging system (and method) with a controllable mirror and multiple fixed mirrors, in accordance with some embodiments of the technology.

As another example, some configurations can include a controllable mirror that is mounted to an imaging device, but is disposed externally to a housing of the imaging device. For example, as illustrated in FIG. 2, another example imaging device 40 includes a housing 42 that encloses a lens arrangement (not shown), an imaging sensor (not shown), and a processor device of any of a variety of known (or other) configurations. In addition, the housing 42 supports a mounting structure 44 that supports a two-axis tiltable mirror 46 and a plurality of fixed mirrors 48.

In addition to other operations, the processor device of the imaging device 40 can be configured to control tilting of the mirror 46 so that optical axes for acquisition of images by the imaging device 40 can be directed in a variety of directions, via the controllable mirror 46 and a respective one of the fixed mirrors 48. In some embodiments, a different number or orientation of fixed mirrors can be provided, with corresponding effects on possible FOVs. However, the illustrated arrangement of four of the mirrors 48 may provide a useful balance between complexity and range, allowing the imaging device 40 to selectively acquire images using multiple FOVs that collectively cover a relatively large total area in all four lateral directions from the imaging device 40. In some embodiments, as also discussed below, fixed mirrors may additionally or alternatively be positioned remotely from an imaging device, to be selectively used in combination with a controllable mirror and, as appropriate, with other fixed mirrors that are attached to the relevant imaging device.

In the illustrated embodiment, the imaging device 40 is configured as a top-mounted, downward-looking imaging device, such as may be suitable, for example, to acquire images of objects moving along a conveyor, through a tunnel, or in various other contexts. In other embodiments, other configurations are possible. For example, imaging devices with similar mirror arrangements as the imaging device 40 (or other mirror arrangements) can be used as sideways or upward-looking mirrors, and imaging devices with different mirror arrangements than the imaging device 40 can be used as downward-looking imaging devices.

Figure 3:
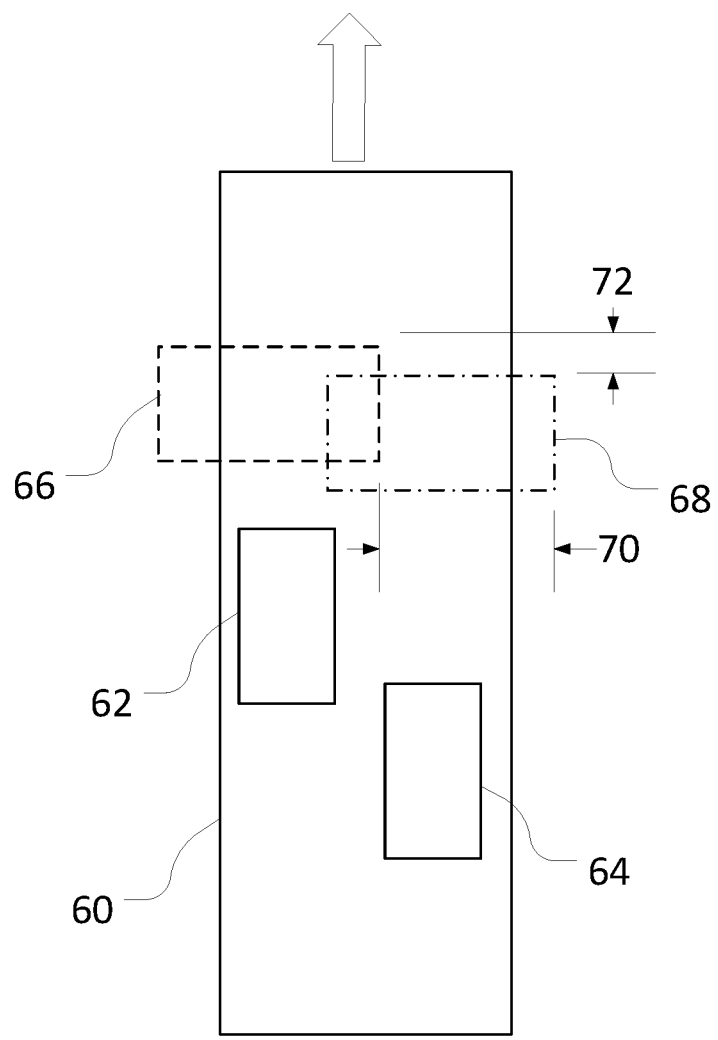
FIG. 3 is a schematic view of aspects of another imaging system (and method) that includes a controllable mirror, in accordance with some embodiments of the technology.

In some embodiments, a controllable mirror can be used to move a FOV for an imaging device in multiple directions relative to a target area, including relative to a conveyor or a relatively large object. For example, FIG. 3 shows a top schematic view of a conveyor 60 that is moving multiple objects 62, 64 in a direction of travel (e.g., bottom to top, as shown). In some implementations, the mirror 30 of the imaging system 20 (see FIG. 1A) or controllable mirrors of other imaging systems can be tilted relative to at least two axes in order to acquire images with separate FOVs that are displaced relative to each other in multiple directions. For example, as illustrated in FIG. 3, the mirror 30 (see FIG. 1A) can be controlled so that a first image is acquired with a first FOV 66 and a second image is acquired with a second FOV 68 that is not aligned with the first FOV 66. In particular, in the example illustrated, the FOV 68 is shifted relative to the FOV 66 by a first distance 70 along the direction of travel and a second distance 72 transverse to the direction of travel, so that the geometric center and edges of the FOV 66 are not aligned (or coincident), respectively, with the geometric center and edges of the FOV 68. Thus, for example, appropriate images can be acquired, using the single imaging device 26 (see FIG. 1A) of both of the objects 62, 64, without necessarily requiring a wide-angle lens or a conventional FOV-expander. In other implementations, however, a controllable mirror can be moved to shift FOVs between separate images in a variety of other ways relative to each other (e.g., along only a single direction), including so that some edges or other areas of two different FOVs may be aligned or coincident with each other.

In some embodiments, a controllable mirror can be moved to allow an imaging device with a FOV that is narrower than a target area to acquire images of an entire width (or other dimension) of a target area without necessarily requiring the imaging device or a lens thereof to be moved and without necessarily requiring the use of a conventional FOV-expander or other similar conventional arrangements. For example, as illustrated in FIG. 3, the FOVs 66, 68 collectively cover more than the full width of the conveyor 60, so that any object moving along the conveyor 60 can be readily imaged.

In some embodiments, an imaging system (e.g., the imaging system 20) can be configured so that a controllable mirror allows acquisition of images that cover at least a substantially full width of a conveyor or other target area, i.e., a width that includes all or nearly all (e.g., 95% or more) of a width of the conveyor or other target area. Accordingly, for example, it may be possible for any object of expected dimensions carried by the conveyor or disposed in the target area to be fully included in an image, at least along a dimension of the object corresponding to a direction of the width of the conveyor or other target area. Accordingly, as also noted above, embodiments of the disclosed technology can be used to replace conventional FOV-expanders, or to selectively acquire images of objects at different lateral (i.e., width-wise) locations on a conveyor.

In some embodiments, use of a controllable mirror to change a FOV for image acquisition can effectively result in changes in a degree of zoom between different images, without necessarily requiring the use of a zoom lens or other similar optical arrangement. For example, as illustrated in FIG. 4A, an imaging system 78 can include an imaging device 80 with a movable mirror (not shown) that is installed in conjunction with another (e.g., fixed) mirror 82 to acquire images of objects 84, 86 that are carried by a conveyor 88. In some implementations, the imaging device 80 can control the movable mirror so that a first image of the object 84 is acquired with a first FOV 90 (see FIG. 4B), at a first location 92 along the conveyor 88, via the movable mirror and the mirror 82. Further, the movable mirror can also be controlled to acquire a later image of the object 84 with a second FOV 94 (see FIG. 4C), at a second location 96 along the conveyor 88.

In the illustrated example, as shown in FIG. 4A, an optical path 98 for the first image, as acquired via the mirror 82, is longer than an optical path 100 for the second image, as acquired without the mirror 82 (e.g., but still using the controllable mirror). Accordingly, as shown in FIGS. 4B and 4C, the FOV 94 is smaller than the FOV 90 and the object 84 is represented in a larger proportion of the FOV 94 than of the FOV 90. This may be useful, for example, so that a symbol 102 on the object 84 occupies a relatively large proportion of the FOV 94, which may sometimes support more effective identification or decoding of the symbol 102 or other image-analysis operations.

In some embodiments, a method or system similar to that illustrated in FIGS. 4A through 4C, or as otherwise disclosed herein, can be used to identify a region of interest in a first image and adjust a FOV for a second image to zoom in on the region of interest in a second image. For example, due to the size of the FOV 90, the first image of the object 84 can be acquired to cover a substantially full width of the conveyor 88 at the first location 92 along the conveyor 88. Accordingly, the first image can be expected to represent an entire width of the object 84, and any features on the object 84 across the imaged width, while the object 84 is disposed on the conveyor at the first location 92. Thus, an image acquired with the FOV 90 can be used to identify a location of the symbol 102, or another region of interest on the object 84, anywhere across the width of the conveyor 88 at the first location 92. For example, using any of a variety of known symbol-identification algorithms, the imaging device 80 can identify a location of the symbol 102, as represented in the first image, at a particular location across the width of the conveyor 88 at a particular time.

Continuing, once the location of the symbol 102 has been determined, the controllable mirror of the imaging device can be selectively tilted for a later image acquisition so that the smaller FOV 94 is aligned with (e.g., centered on) the expected location of the symbol 102 at the time of the later image acquisition (e.g., as determined using an encoder). Further, due to the shorter length of the optical path 100, the symbol 102 can occupy a relatively large proportion of an image acquired with the FOV 94, so that decoding (or other analysis) of the symbol 102 may proceed more efficiently or with a higher rate of success or reliability.

In some implementations, a focus of a lens arrangement of an imaging device may need to be adjusted in order to allow successive images of appropriate quality to be acquired despite changes in a length of respective optical axes and changes in size of respective FOVs. In this regard, for example, as also discussed above, a lens arrangement of the imaging device 80 can be adjusted before, simultaneously with, or after adjustment of the controllable mirror. In some embodiments, for example, a liquid lens can be brought to a predetermined focus as or after the controllable mirror is moved, based on a prior focus calibration or a prior determination of a height (or other dimension) of an object to be imaged. In some embodiments, an autofocus operation can be executed after movement of the controllable mirror, in order to focus the imaging device 80 appropriately.

In the example illustrated in FIGS. 4A through 4C, the FOVs 90, 94 do not overlap with each other. In some embodiments, however, first and second images can be acquired with FOVs that do overlap. For example, in a different arrangement, the imaging device 80 can be configured to acquire an image of the object 84, via an optical path 104 (see FIG. 4A) that is defined by the controllable mirror and excludes the fixed mirror 82. Accordingly, the object 84 can be imaged with a greater degree of zoom and a smaller FOV than images acquired with the FOV 90, but with the object 84 at or near the location 92 corresponding to the FOV 90.

Figure 5A:
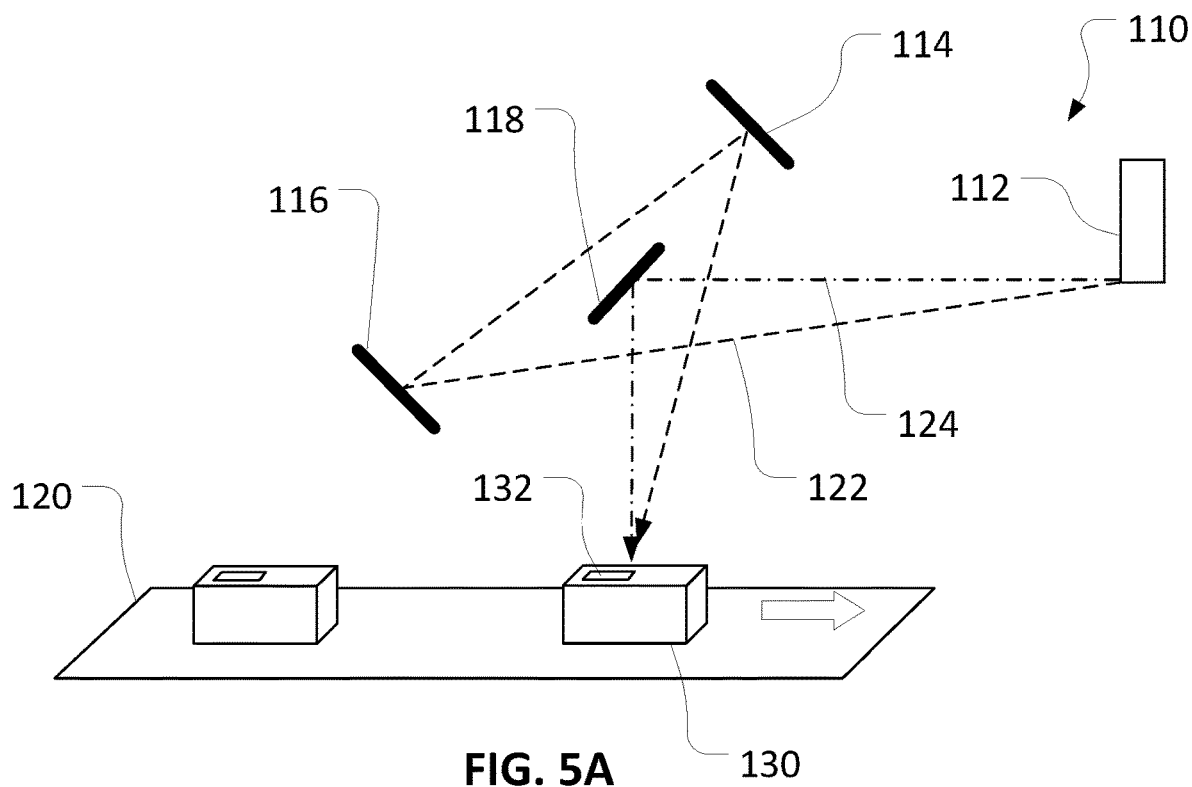
FIGS. 5A and 5B are schematic views of yet another imaging system (and method) that includes a controllable mirror, in accordance with some embodiments of the technology.

As another example, some embodiments may allow for acquisition of overlapping images with a different (e.g., reduced) angle of incidence of a second optical path than is illustrated for the optical path 104. In some embodiments, overlapping FOVs with similar angles of incidence for the respective optical paths can be acquired using multiple fixed (or other) mirrors in addition to a controllable mirror. For example, as illustrated in FIG. 5A, an imaging system 110 includes an imaging device 112 with a controllable mirror (not shown) and a set of remotely installed fixed mirrors 114, 116, 118. The mirrors 114, 116, 118 and the imaging device 112 are arranged relative to a conveyor 120 so that a first optical path 122 defined by the movable mirror and the fixed mirrors 114, 116 (but not the fixed mirror 118) is longer than a second optical path 124 defined by the movable mirror and the fixed mirror 118 (but not the fixed mirrors 114, 116).

Figure 5B:
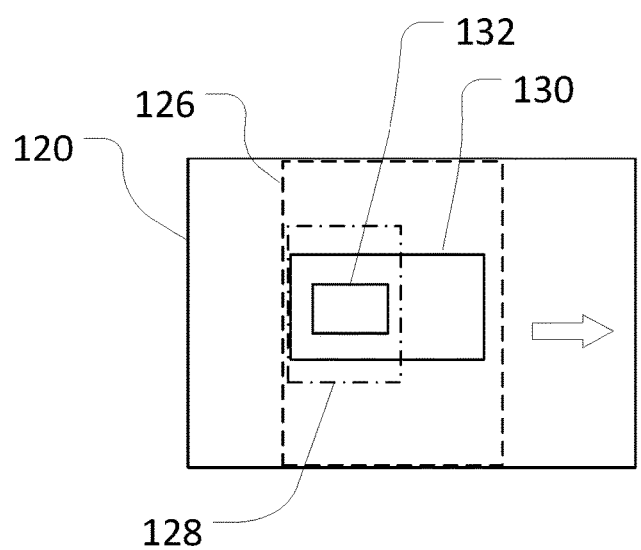

Accordingly, as illustrated in FIG. 5B, an image acquired along the first optical path 122 can exhibit a FOV 126 that is larger than a FOV 128 of an image acquired along the second optical path 124, and an object 130 and an associated symbol 132 can occupy a larger proportion of the FOV 128 than of the FOV 126. Thus, as similarly described above, the object 130 and the symbol 132 can be initially imaged via the FOV 126, then re-imaged via the FOV 128 in order to increase a degree of zoom relative to the symbol 132.

Further, with sufficiently fast adjustment of the movable mirror of the imaging device 112 and of the focus of the lens arrangement, an image of the object 130 can be obtained via both of the FOVs 126, 128 with the FOVs 126, 128 substantially coinciding with each other on the conveyor 120. In other words, substantially overlapping images can be acquired via both of the FOVs 126, 128 with the object 130 at substantially the same location on the conveyor 120. In some embodiments, this substantial overlap can be readily obtained due to the potential adjustment time for a controllable mirror and focus (e.g., using a liquid lens) being of an order of magnitude (or more) smaller than an amount of time for an object to move substantially along a conveyor. As used herein, two images are considered to substantially overlap if the FOV of one of the images is entirely contained by or coincident with the FOV of the other image, or if at least 90% (e.g., 95% or 99%) of the FOV of one of the images overlaps with the FOV of the other image. Similarly, an object is considered to be at substantially the same location at two different times for imaging if the object has not changed locations between two images or has only moved so that a later position of the object varies from an earlier position of the object by less than 10% (e.g., 5% or 1%) of a length of the object along the direction of movement.

As also noted above, it may sometimes be useful to determine a dimension of an object. For example, it may be useful in logistical operations to know one or more dimensions of a particular object that is traveling along a conveyor. Or it may be helpful for focusing operations for image acquisition to know a distance from an object to an imaging device, such as may be determined, for example, based on a known (or measured) distance from the imaging device to a conveyor and a determined height of the object relative to the conveyor.

Figure 6:
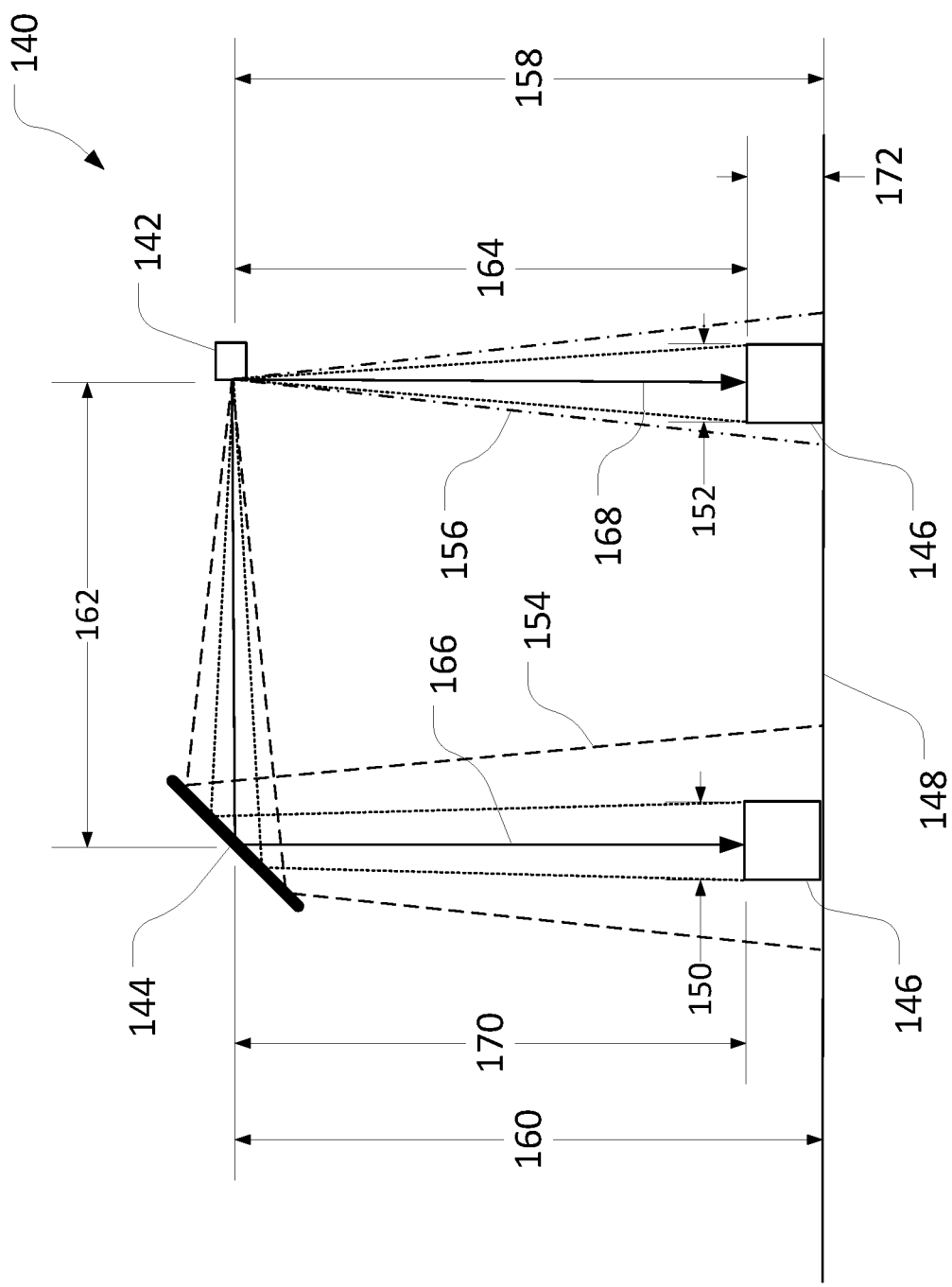
FIG. 6 is a schematic view of a further imaging system (and method) that includes a controllable mirror, in accordance with some embodiments of the technology.

In some embodiments, an imaging system with a controllable mirror can be operated in order to determine a dimension of an object, without necessarily requiring the use of a separate dimensioner (e.g., a time-of-flight or triangulation device). For example, FIG. 6 illustrates an imaging system 140 that includes an imaging device 142 with a controllable mirror (not shown) and a remotely installed fixed mirror 144 (e.g., similar to the imaging device 80 and mirror 82 illustrated in FIG. 4A). Similarly to the imaging system 78, the imaging system 140 can be controlled to acquire a different image of an object 146 as the object 146 moves along a conveyor 148 (e.g., at substantially different locations along the conveyor 148, as shown).

In addition, a processor device of the imaging system 140 is configured to analyze the acquired images in order to identify, in acquired images, pixel dimensions of a common feature of the object 146 (e.g., a top surface of the object 146). For example, using known edge location techniques the imaging system 140 can identify leading and trailing edges of a top surface the object 146, and a respective pixel distance 150, 152 therebetween, both for an image that is acquired via a larger FOV 154 defined by the mirror 144 and for an image that is acquired via a smaller FOV 156 not defined by the mirror 144.

Accordingly, for example, known trigonometric principles (e.g., triangular equivalences) can then be applied to determine a distance 164, 170 from the imaging device 142 or the mirror 144 to the object 146 and, correspondingly, a distance 172 that the object 146 extends away from the conveyor 148 (e.g., an object height). For example, any one of the distances 164, 170, 172 can be determined based on the determined pixel distances 150, 152, and appropriate consideration of one or more of a known (or determined) distance 158 from the imaging device 142 to the conveyor 148, a known (or determined) distance 160 from the mirror 144 to the conveyor 148, a known (or determined) distance 162 from the imaging device 142 to the mirror 144, and known (or determined) relative angles of optical paths for the FOVs 154, 156. As a specific example, with optical paths 166, 168 for the FOVs 154, 156 traveling in parallel with and at right angles to the conveyor 148 and with the imaging device 142 and the mirror 144 at equal distances 158, 160 above the conveyor 148 (and thereby equal the distances 164, 170 from the object during respective image acquisitions), the distance 172 (e.g., the height of the object 146, as shown) can be calculated by solving, for $h_o$, $$L_1/(h_i - h_o) = L_2/(h_i + d - h_0) \quad (1)$$

where $L_1$ and $L_2$ indicate spatial equivalents to the pixel distances 150, 152 (e.g., as determined based on known calibration techniques), $h_i$ indicates the distance 158 (or 160) of the imaging device 142 (or the mirror 144) from the conveyor, and d indicates the distance 162 from the imaging device to the mirror 144.

It will be recognized that other approaches can also effectively provide similarly useful information. For example, rather than (or in addition to) solving directly for the height of an object, the imaging system 140 can use a similar approach to determine the distance 164 from the imaging device 142 to the object 146 (e.g., the distance from the imaging device 142 of a focal plane for imaging the object 146), such as by solving, for f, $$L_1/f = L_2/(f + d) \quad (2)$$

Where $L_1$, $L_2$, and d are defined as above. This solution in particular assumes, for example, that equal values for the distances 158, 160 between the conveyor 148 and the imaging device 142 and between the conveyor 148 and the mirror 144. In other approaches, however, this equality (or other assumptions above) may not hold, and corresponding adjustments, based on known trigonometric principles, can be made.

Indeed generally, although the examples above assume particular geometric arrangements of the imaging device 142, the mirror 144, and the optical paths 166, 168, similar trigonometric principles can be readily used to determine a distance from an imaging device to an object, a height or other dimension of an object, or other relevant dimensions, including for other arrangements illustrated in the various FIGS. For example, similar trigonometric calculations can be implemented to determine appropriate distances for the arrangement illustrated in FIG. 5A, with known distances and relative angular orientations between the imaging device 112, the mirrors 114, 116, 118, and the conveyor 120 allowing for ready determination, based on images acquired with both of the FOVs 126, 128, known types of pixel analysis, and known trigonometric principles, of a height of the object 130 relative to the conveyor, a length of the optical path 122, or other related dimensions.

In some embodiments, determining a distance can be useful for other reasons, including for determining real-world (i.e., actual, physical) dimensions of a FOV (or portion thereof) for a particular image. For example, the size of the real-world area included in a FOV at a particular focus plane can be determined using known trigonometric relationships based on a determined distance between an imaging device and a target (e.g., the distance of the optical path 168), along with characteristics of the relevant imaging device and other optical devices (e.g., lens or mirror assemblies). Similar principles can also be applied to determine the scale of an object within a FOV.

Figure 7A:
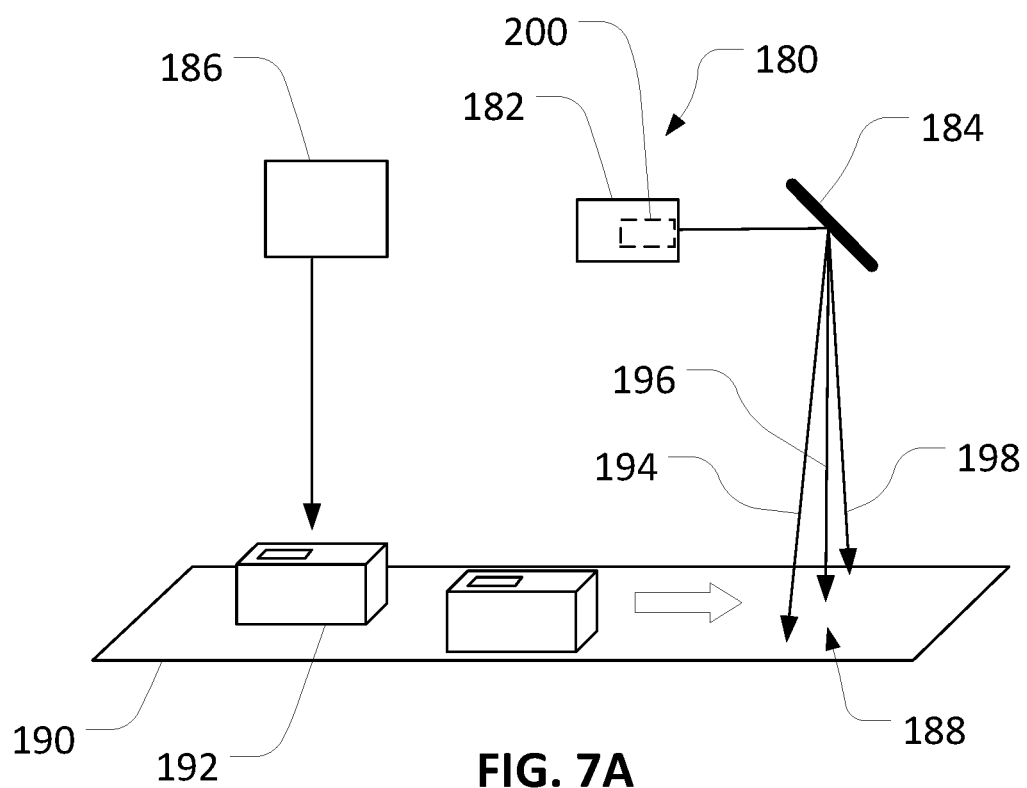
FIG. 7A through 7C are schematic views of still a further imaging system (and method) that includes a controllable mirror, in accordance with some embodiments of the technology.
Figure 7B:
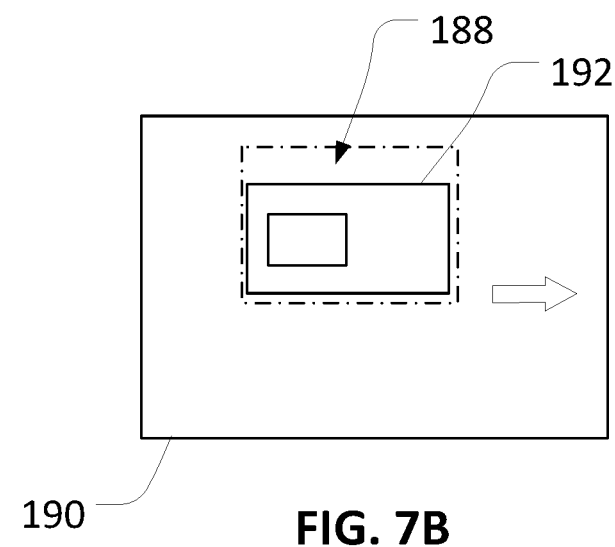

In some embodiments, the principles disclosed herein (e.g., as detailed above) can be implemented in combination with additional sensors. For example, as illustrated in FIG. 7A, an imaging system 180 can include an imaging device 182 with a controllable mirror 184, and a sensor 186 located rearward of an imaging location 188 for the imaging device 182, relative to a direction of travel of a conveyor 190. In some embodiments, the sensor 186 can be a presence sensor such as a photo eye, array of photo eyes, laser curtain, and so on. Based on detection of objects by the sensor 186 and on a known rates of movement of objects on the conveyor 190 (e.g., as determined via an encoder (not shown)), the mirror 184 can be controlled to direct a FOV for a particular image of an object 192 to a portion of the imaging location 188 in which the object 192 can be imaged (see FIG. 7B). For example, the mirror 184 can be controlled to selectively redirect optical paths 194, 196, 198 for acquisition of images at different laterally directed angles relative to the conveyor 190. Thus, for example, the disclosed control of the mirror 184 and imaging device 182 can allow acquisition of images of objects, with a relatively high degree of zoom, regardless of the lateral location of the objects on the conveyor 190 and without requiring a FOV for the imaging device 182 that covers a full width of the conveyor 190 for a given image.

In other embodiments, other configurations are possible. For example, the sensor 186 can be configured as a 3D sensor, such as a time-of-flight or triangulation sensor, that can determine a height of an object relative to the conveyor 190. This information, in combination with information regarding where on the conveyor 190 an object is located (e.g., as also determined by the sensor 186), can then be used to determine an appropriate focus for imaging of a particular surface of the object as well as, for example, an appropriate optical path and FOV.

In this regard, and relative to other embodiments disclosed herein, reference to determination of object "height" is generally provided as an example only, as is reference to operations relating to a "top" surface of a particular object. Those of skill in the art will recognize, based on the disclosure herein, that similar principles can be used, for example, to determine other relevant dimensions of objects and to acquire images of surfaces of objects other than top surfaces. Correspondingly, for example, in some configurations a sensor (e.g., the sensor 186) can be used to determine a distance of a relevant optical (e.g., imaging) axis, and focus for image acquisition can then be determined accordingly (e.g., as also based on known characteristics of a lens assembly, image sensor, and so on).

In some embodiments, a distance sensor or other component can be provided that also utilizes a controllable mirror to direct outgoing or incoming optical signals. In some embodiments, such signals can be directed with a controllable mirror that is also used for image acquisition, although dedicated mirrors are also possible. For example, referring again to FIG. 7A, an optical device 200 can be configured to direct (or receive) an optical signal via the mirror 184, which also controls the orientation of a FOV for the imaging device 182, in order to project a signal onto (or receive a signal from) a target area. In some embodiments, the device 200 can be configured as an aimer that projects an aiming pattern via the mirror 184, so that operators can visually identify a center, outside boundaries, or other aspect of a FOV of the imaging device 182.

In some embodiments, the device 200 can be configured as a distance sensor. For example, the device 200 can be configured as a time-of-flight sensor that directs a pulse onto an object via the mirror 184 and then receives a reflection of the pulse also via the mirror 184, in order to determine a distance of a current optical path for imaging as provided by the mirror 184. Or various other distance sensors can be used.

Figure 7C:
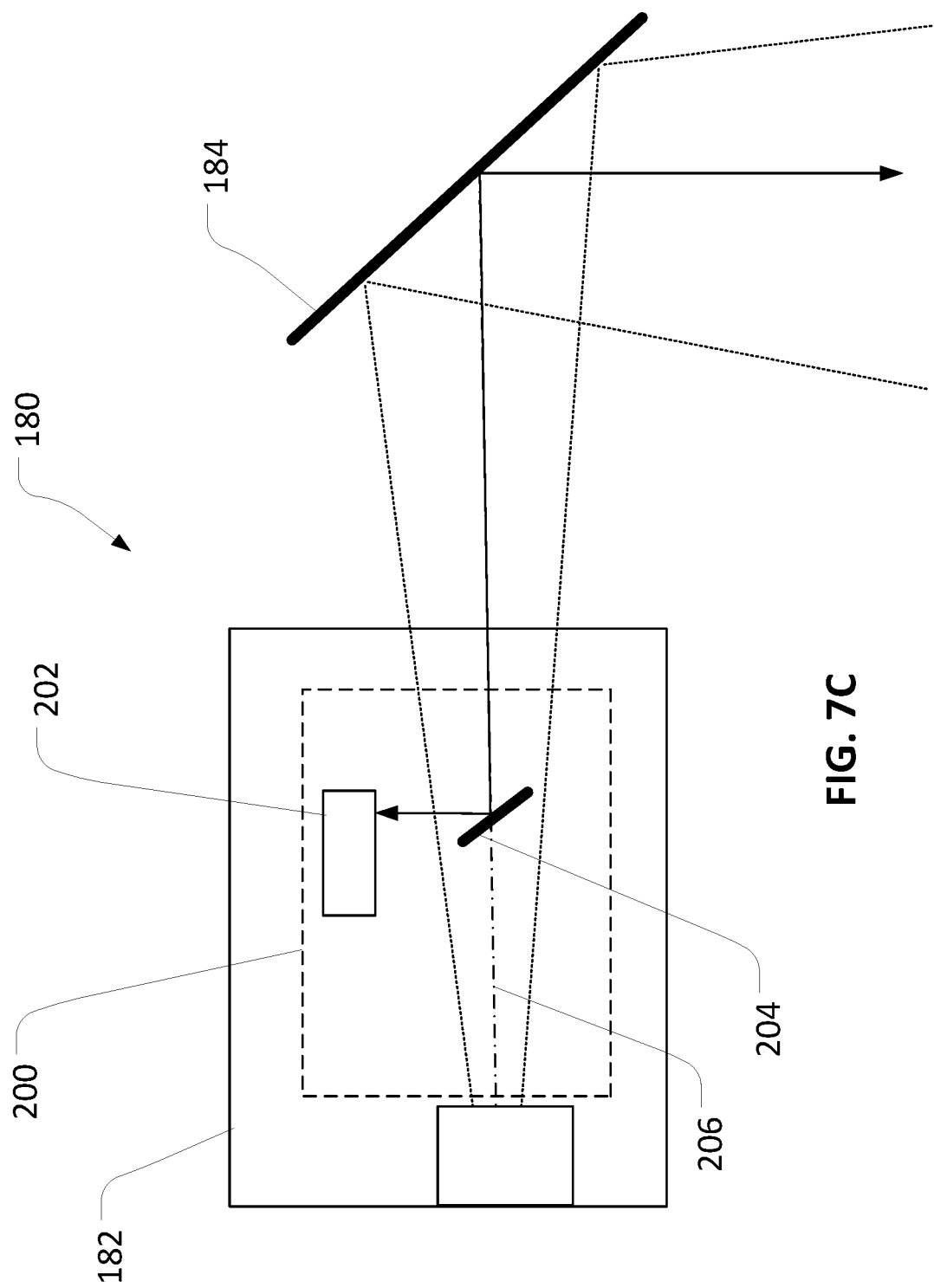

In some embodiments, the optical device 200 can be configured to provide or receive on-axis signals relative to the imaging axis of the imaging device 182. For example, as illustrated in FIG. 7C, the optical device 200 can include a signal generator (or receiver) 202 that is out of alignment with an optical (e.g., imaging) axis 206 for the imaging device 182 (e.g., perpendicular thereto). Further, a dichroic mirror 204, or other similar arrangement to permit light for imaging to pass while appropriately redirecting light from (or for) the signal generator (or receiver) 202, can be disposed in alignment with (i.e., along) the optical axis 206. Accordingly, the dichroic mirror 204 can redirect signals from the signal generator (receiver) 202, via the mirror 184, to a target (not shown), and can also redirect signals from the target, via the mirror 184, to the signal generator (or receiver) 202.

Similar principles can also be implemented in other embodiments. For example, other embodiments expressly discussed and illustrated herein can be similarly equipped with on-axis or other aiming or measurement devices. In some embodiments, similar principles can also be applied even without inclusion of an imaging device. For example, an imaging device such as the imaging device 182 of FIG. 7A or the imaging device 26 of FIG. 1A (and so on) can be replaced with a projector or other similar device that is configured to direct signals onto an associated controllable mirror (e.g., the mirror 184 or the mirror 20) and thereby controllably project a signal onto a target. Such an arrangement may be useful, for example, in order to provide targets to guide picking, placement, calibration, or other operations by human operators, or to otherwise improve visibility or operability for aspects of certain objects or environments.

Figure 8A:
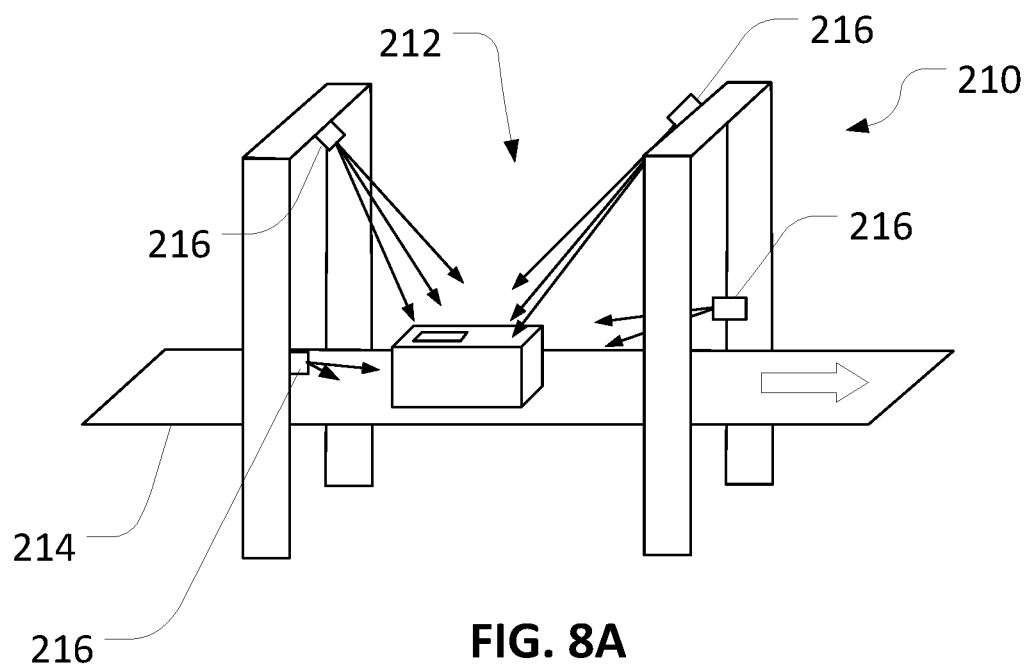
FIGS. 8A and 8B are schematic views of an imaging system (and method) that includes a controllable mirror and is configured as (or for use with) a tunnel for a conveyor, in accordance with some embodiments of the technology.

Correspondingly, in some embodiments, a controllable mirror can be used to acquire images of multiple sides of an object, including for tunnel applications in which images are to be acquired of five or more sides of an object as the object passes through a particular area (e.g., along a particular length of a conveyor). For example, in the imaging system 210 illustrated in FIGS. 8A and 8B, a tunnel 212 along a conveyor 214 can include a plurality of imaging devices 216, at least some (e.g., each) of which include a controllable mirror (not shown). Accordingly, via appropriate control of the mirrors, the imaging devices 216 can be used to acquire images over a full span of desired FOVs, in lieu of image acquisition with a much larger number of conventional imaging devices. For example, in the example illustrated in FIG. 8A, four of the imaging devices 216 can be used to replace fourteen (or more) imaging devices in conventional arrangements for imaging of all five exposed sides of an object passing through the tunnel 212.

Figure 8B:
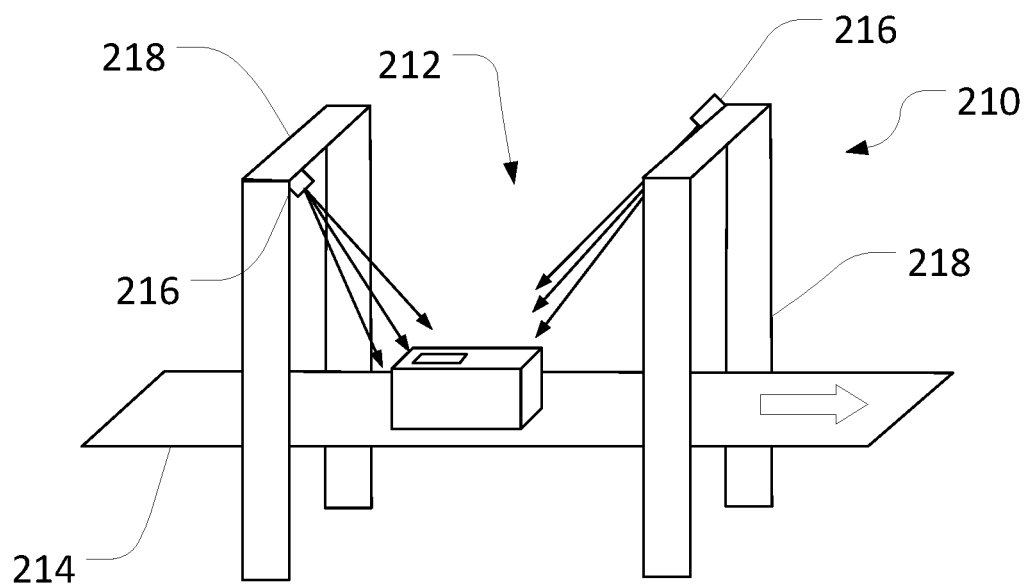

In other embodiments, however, a different number of imaging devices for use with controllable mirrors can be used, or can be in place of a different number of conventional imaging devices. For example, as illustrated in FIG. 8B, some arrangements may include only two of the imaging devices 216, arranged so that controllable mirrors for the imaging devices 216 can be manipulated in order to capture images of all exposed sides of an object as the object moves through the tunnel 212. In the example of FIG. 8B, the imaging devices 216 are supported at the top of support structures 218 of the tunnel 212 on opposing lateral and front-to-back sides of the tunnel 212, although other configurations are possible. For example, other arrangements of the imaging devices 216 with the imaging devices still located above a maximum expected height of objects passing through the tunnel 212 may also allow all five exposed sides of 3D rectangular objects—including the tops of the objects—to be imaged.

Figure 9A:
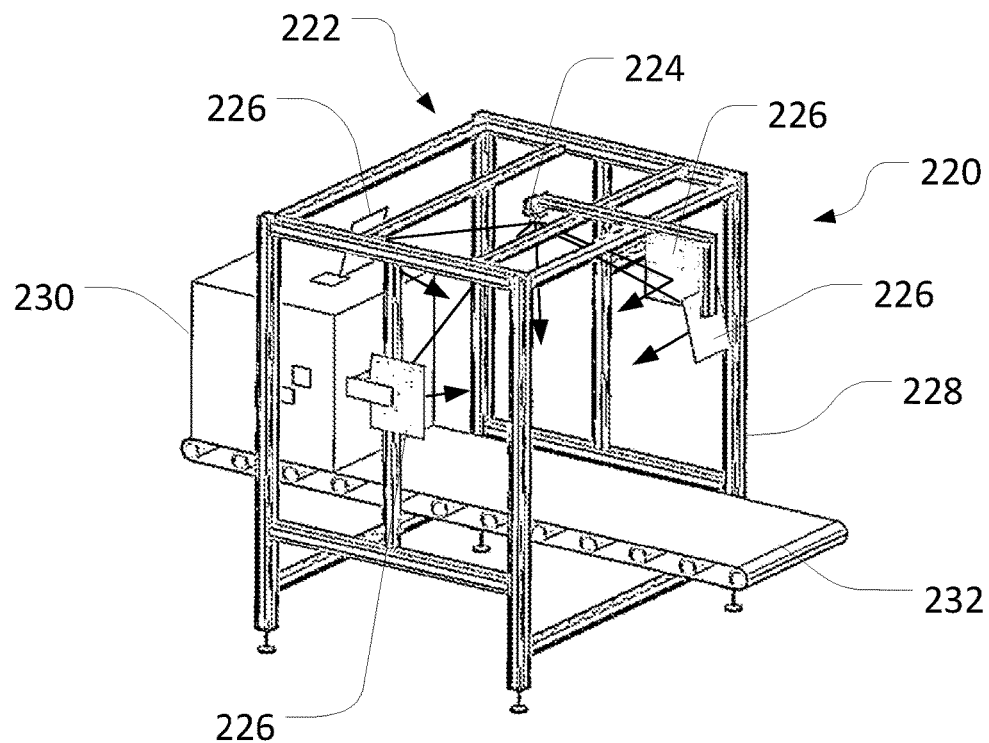
FIG. 9A is a schematic view of another imaging system (and method) that includes a controllable mirror and is configured as (or for use with) a tunnel for a conveyor, in accordance with some embodiments of the technology.

In some embodiments, a combination of controllable and fixed mirrors can be used to acquire images of multiple sides of an object, including in tunnel applications. For example, as illustrated in FIG. 9A, an imaging system 220 for a tunnel 222 can include a single imaging device 224 with a controllable mirror, such as an imaging device configured similarly to the imaging device 40 of FIG. 2. Further, the tunnel 222 can include a plurality of fixed mirrors 226 supported on different sides of a support structure 228 for the tunnel 222. With this arrangement and other similar arrangements (e.g., with different numbers or configurations of imaging devices or fixed mirrors), the controllable mirror can be moved to allow successive acquisition of images, via different reflections off of the fixed mirrors 226, of all five visible sides of an object 230 as a conveyor 232 moves the object 230 through the tunnel 222. For example, as the object 230 moves through the tunnel 222, images can be successively acquired, using different instances of the mirrors 226, of a front, top, left, right, and back side of the object 230.

Figure 9B:
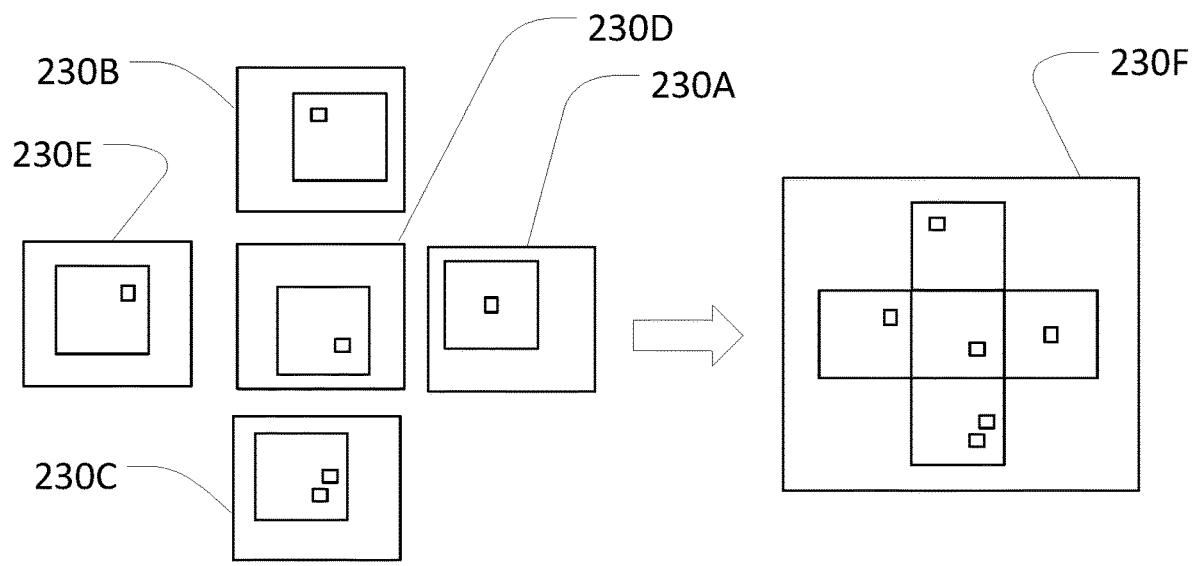
FIG. 9B is a schematic view of a stitching operation for images acquired using the imaging system of FIG. 9A.

In some embodiments, multiple images acquired using a controllable mirror can be stitched together to provide a composite representation of a particular object or environment. As illustrated in FIG. 9B, for example, the imaging system 220 can be configured to acquire images 230A through 230E of the front, right, left, top, and back sides of the object 230 as the object 230 moves through the tunnel 222. Using known image processing techniques the images 230A through 230E can then be stitched together in order to provide a composite image 230F that represents all five exposed sides of the object 230. For example, known edge-finding techniques can be used to identify the edges of each of the sides of the object 230 in the images 230A through 230E, and thereby to identify relevant boundaries of the object 230 in the images 230A through 230E. These identified boundaries can then be used to construct the composite image 230F, such as by aligning identified common boundaries from different images, with appropriate perspective and scaling adjustments, as needed.

In the illustrated example, for simplicity of presentation, only one side of the object 230 is represented in each of the images 230A through 230E. In some implementations, each of the images 230A through 230E may also include a representation of part or all of one or more other sides of the object 230. In some implementations, these additional sides can be ignored. In some implementations, they can be used in order to assist in constructing a composite image, such as by identifying common or overlapping features between the various images 230A through 230E and using those features to assist in determining relative alignment, necessary scale or perspective adjustments, or other parameters to effectively stitch the images together.

In some embodiments, known orientations of controllable mirrors as well as other known parameters (e.g., parameters of lens assemblies, encoder information to identify current object positions, etc.) can be used in order to automatically determine necessary perspective and scaling adjustments for composite images. For example, using known trigonometric principles, a relative scale and perspective of different images acquired via the mirrors 226 can be determined, and then images acquired via one or more of the mirrors 226 can be adjusted accordingly so that the images can be more readily combined.

Also as illustrated in FIG. 9B, the image 230F is a two-dimensional (2D) image that provides a "flattened" representation of the sides of the object 230. In other embodiments, different 2D representations can be used, such as different flattened representations. In some embodiments, a composite image can be a 3D image or model, with a 3D representation of a particular object, as constructed from multiple images acquired using a controllable mirror.

Figure 10:
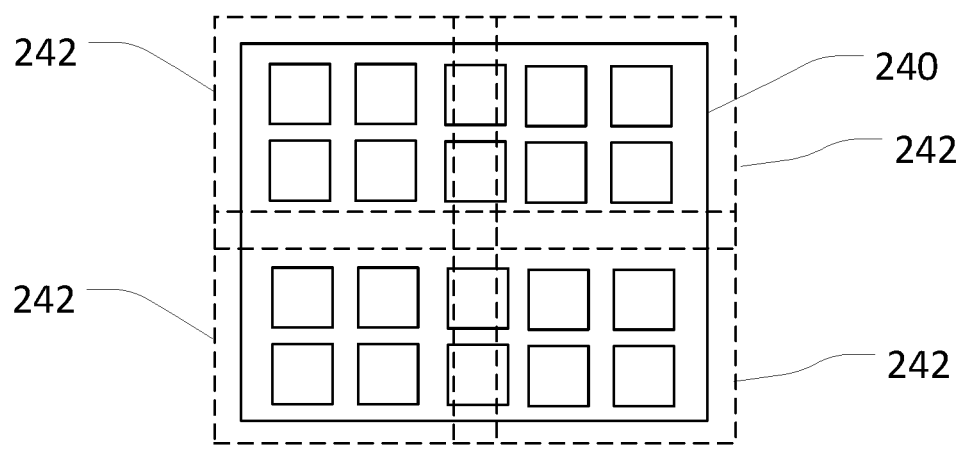
FIG. 10 is a schematic view of images acquired using an imaging system or method, in accordance with some embodiments of the technology.

In some embodiments, the principles disclosed herein can be used to acquire multiple images of a single object or of an array of objects. In some embodiments, multiple overlapping images can be acquired, such as may be useful to allow inspection of objects (or arrays) that are relatively large as compared to a FOV of a relevant imaging device. For example, as illustrated in FIG. 10, an imaging device (not shown) with a controllable mirror (e.g., similar to the examples discussed above) can be controlled to capture multiple images of a printed circuit board panel 240, with multiple overlapping FOVs 242. Accordingly, for example, without the use of a conventional FOV-expander or wide-FOV imaging device, the entire panel 240 can still be readily imaged and analyzed. In some embodiments, for example, images for all of the FOVs 242 can be stitched together using known techniques, in order to provide a single composite image of the panel 240 for analysis.

Figure 11:
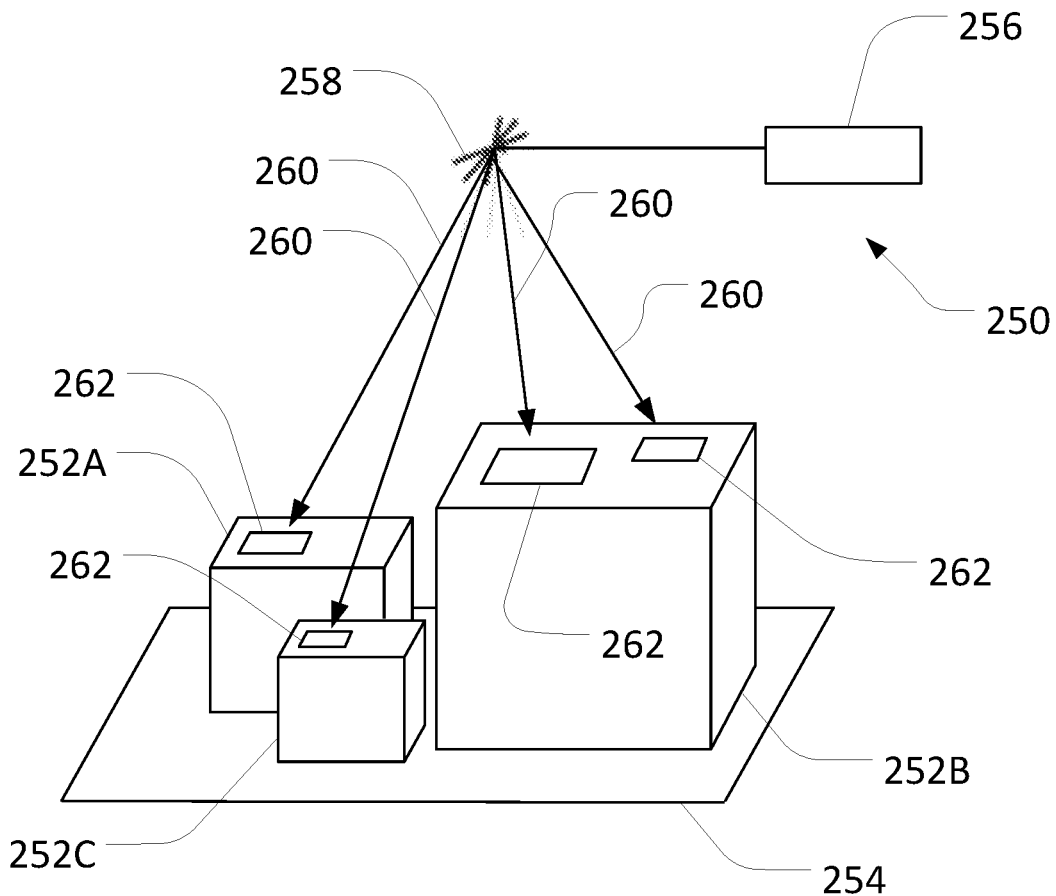
FIG. 11 is a schematic view of an additional imaging system (and method), in accordance with some embodiments of the technology.

As another example, some embodiments can be configured to selectively acquire different images of different portions of an object. For example, the imaging system 250 illustrated in FIG. 11 can be used to selectively acquire images of multiple discrete portions of a single object, such as may be useful to identify and analyze particular symbols (e.g., direct part marking symbols) on the object, or to selectively acquire images of multiple objects within a particular target area. In particular, in the embodiment illustrated, the imaging system 250 includes an imaging device 256 (e.g., as discussed above) and a controllable mirror 258 (e.g., a two-axis mirror). During operation, the mirror 258 can be controlled in order to selectively direct optical paths 260 for image acquisition to different locations within a target area 254 that includes multiples objects 252A, 252B, 252C. Thus, images can be acquired of each of multiple symbols 262 on the objects 252A, 252B, 252C, even though the symbols 262 may be at different focus planes and dispersed over a relatively large footprint. Accordingly, for example, the imaging system 250 can readily acquire high quality images of each the symbols 262, at different focus planes and over a large total scan area, without necessarily requiring the high resolution and large depth of field imaging devices that may be required under conventional approaches. Further, the imaging system 250 can readily acquire images of multiple symbols on a single particular object, such as is shown for two of the symbols 262 on the object 252B, whether in one image or multiple images.

In some embodiments, a focus setting and angular orientation for each of the optical paths 260 can be pre-determined, such as through pre-runtime manual or automated calibration, based on expected characteristics of the object 252 and expected locations of the symbols 262. In some embodiments, focus settings and angular orientations for the optical paths 260 can be determined according to other techniques presented above, such as through combined operation with a 3D sensor or through distance analysis accomplished via acquisition of multiple images in order to determine an appropriate optical path or focus for each relevant image acquisition.

In some embodiments, a controllable mirror can be used to provide runtime recalibration of an imaging system, such as to protect against temperature-induced focus drift or other effects. For example, a controllable mirror can be configured to occasionally direct a FOV for imaging towards a calibration target, to verify or determine necessary corrections for a current focus or other operational setting.

Figure 12:
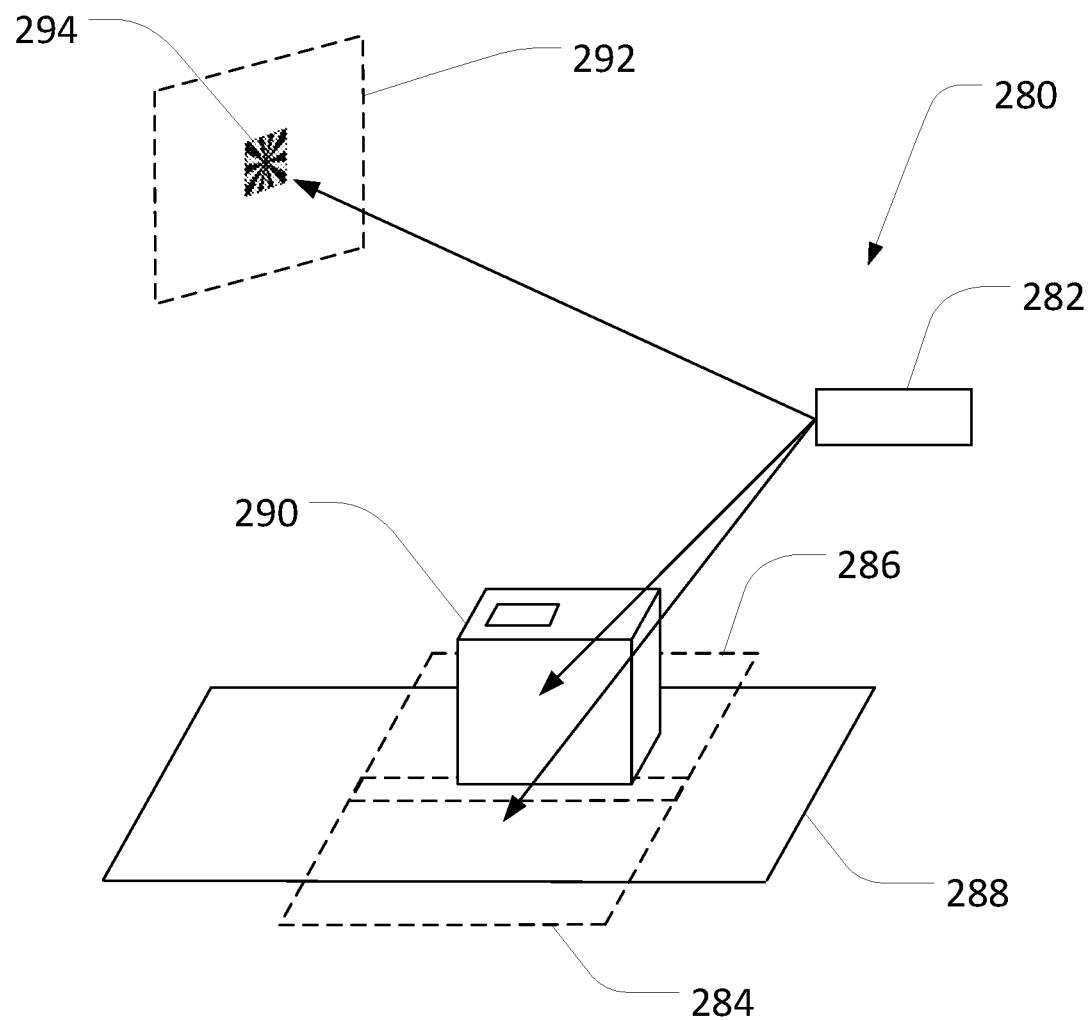
FIG. 12 is a schematic view of another imaging system (and calibration method) in accordance with some embodiments of the technology.

As illustrated in FIG. 12, for example, an imaging system 280 includes an imaging device 282 that is equipped with a controllable mirror (not shown) that is configured to selectively direct a FOV of the imaging device 282 for image acquisition. For operational image acquisition, the controllable mirror can be manipulated to allow the imaging device 282 to acquire successive images. For example, in some applications the mirror can be successively aligned for image acquisition via FOVs 284, 286 that cover an entire lateral width of a conveyor 288. Thus, for example, useful images of an object 290 can be acquired regardless of where the object 290 is disposed along the width of the conveyor 288.

Further, the controllable mirror can also be manipulated to sometimes provide a third (or other additional) FOV 292 that includes a calibration target 294. Thus, for example, based on known trigonometric principles, and known aspects of the calibration target and the imaging device 282, calibration of focus (or other aspects) of the imaging device 282 can be continually and automatically confirmed or corrected, even during active runtime operations. In some embodiments, the mirror can be controlled to allow imaging of the calibration target for each imaging cycle (i.e., so that each imaging cycle includes one image for each of the FOVs 284, 286, 292). In other embodiments, however, other sequences are possible.

Figure 13:
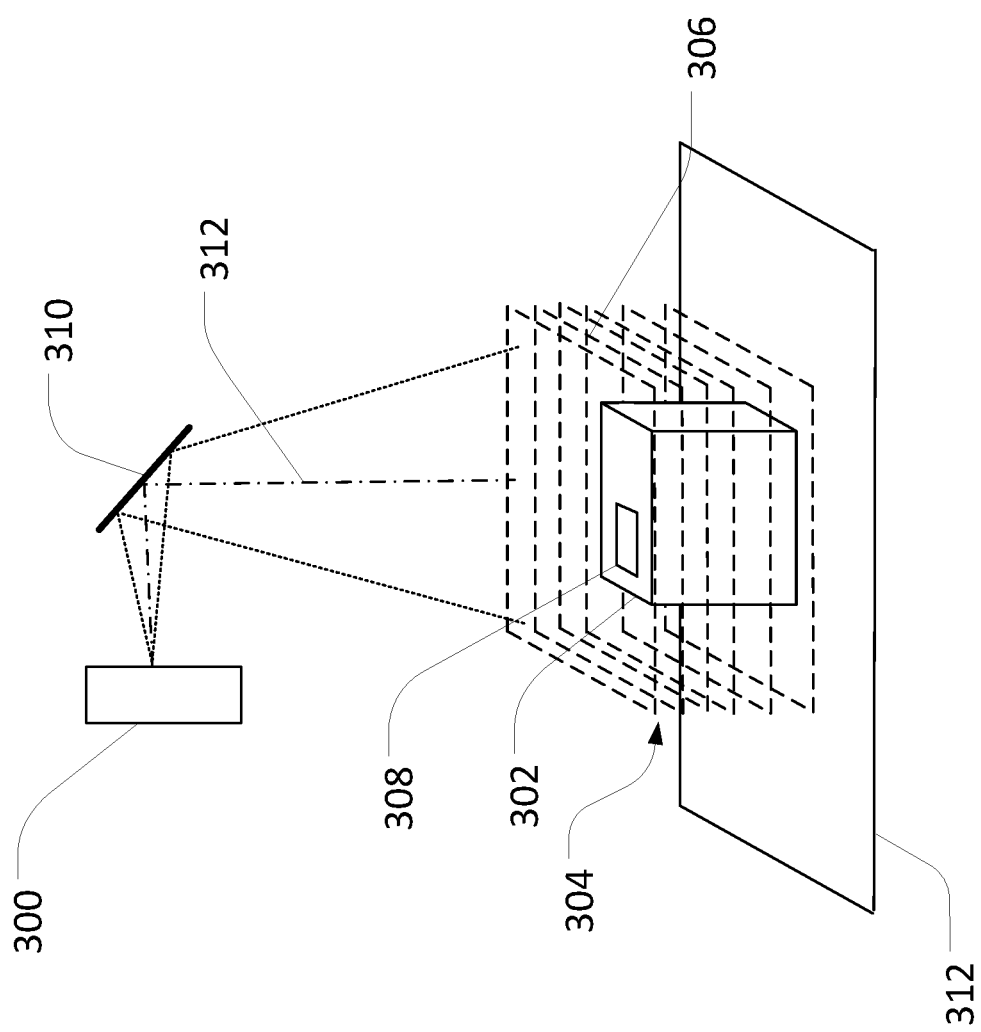
FIGS. 13 and 14 are schematic views of further imaging systems (and methods) in accordance with some embodiments of the technology.

In some embodiments, a controllable mirror can be used for acquisition of images of a particular object or area using multiple different focus settings (e.g., as discussed above), or can otherwise be used to optimize focusing operations. In some embodiments, controllable mirrors can be used to assist in autofocus operations or image acquisition subsequent to autofocus operations. For example, as illustrated in FIG. 13, an autofocus operation for an imaging device 300 can include acquisition of different images of an object 302 at each focal plane of a set of different focal planes 304. Once an optimal focal plane has been determined, the focus settings for subsequent image acquisition, at least for imaging the object 302, can then be limited accordingly. For example, once a focal plane 306 has been identified to be aligned for sharp focus on a symbol 308 on the object 302, subsequent image acquisition for the object 302 may be limited to only the focal plane 306, or to an acceptable or intended deviation therefrom.

In some embodiments, a set of one or more controllable or fixed mirrors (e.g., including a controllable mirror 310) can assist in autofocus operations, such as by appropriately aligning a FOV or optical axis for autofocus image acquisition or providing a particular optical path length for a particular FOV and focus setting (e.g., according to one or more of the various approaches discussed above). In some embodiments, after initial autofocus operations have completed, an arrangement of one or more controllable or fixed mirrors (e.g., including the controllable mirror 310) can be operated in conjunction with focus adjustments (e.g., using a high speed liquid lens) for subsequent image acquisition.

In some embodiments, with an optimal focal plane having been determined using controllable mirrors or otherwise (e.g., as discussed above), subsequent adjustments to the focus of a lens can be determined based in part on adjustments of a controllable mirror for subsequent image acquisition, such as by applying known trigonometric principles to determine changes in (or a current value of) an optical path length based on adjustments of the controllable mirror. For example, as the mirror 310 is adjusted to track movement of the object 302 by a conveyor 312 (or other movement), known trigonometric principles can be used to determine a current length of an optical path 312 based on a current orientation and location of the mirror 310 and the orientation and location of any other mirrors (not shown) or relevant optical devices (e.g., the imaging device 300) along the optical path 312. A focus of a liquid lens (not shown) or other lens assembly for the imaging device 300 can then be adjusted accordingly, to retain the previously determined focus at the focal plane 306 or to provide a particular (e.g., predetermined or maximum) deviation therefrom. Thus, for example, rather than execute autofocus operations multiple times over a tracking (or other) operation for imaging an object, an optimal focal plane can be determined just once and subsequent focus adjustments can be made automatically based on mirror-driven changes in optical path length.

In some embodiments, an arrangement of one or more controllable or fixed mirrors can be used to acquire images of an object or target area at multiple focal planes. This may be useful, for example, to support creation of a depth map of a particular area, to analyze symbols at multiple focal planes, or for various other reasons.

Figure 14:
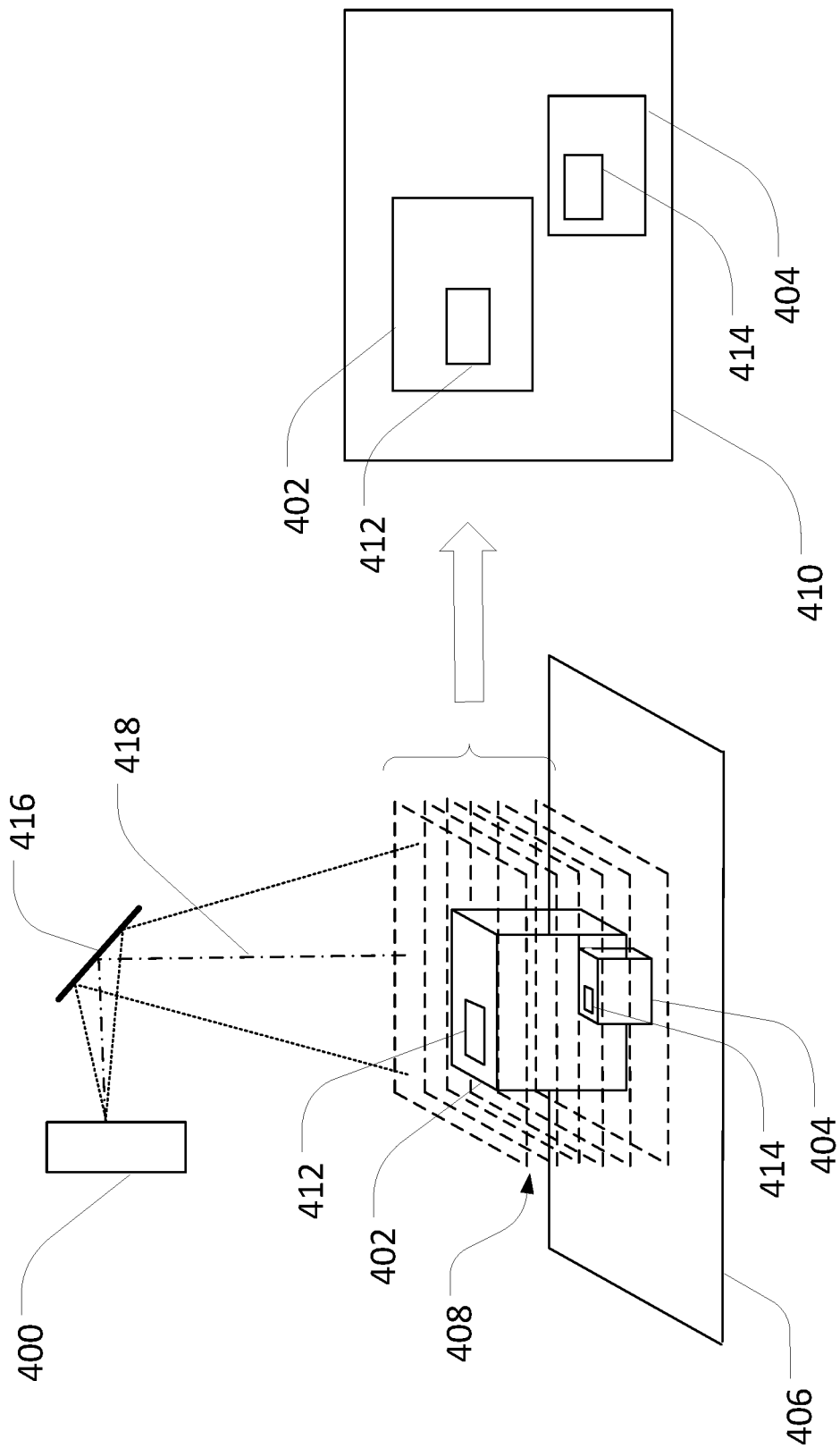

As one example, as illustrated in FIG. 14, an imaging device 400 can be configured to acquire images of objects 402, 404 as the objects 402, 404 rest in a target area or move through space (e.g., along a conveyor 406). Through adjustment of the focus of a liquid lens or other lens assembly (not shown) of the imaging device 400, and other relevant adjustments (e.g., of a controllable mirror) at least one image can be acquired of the objects 402, 404 at each of a plurality of focal planes 408. As appropriate, information from these images can then be combined, using known image processing techniques, in order to create a depth map of a target area that includes the objects 402, 404 or to otherwise create a composite image 410, such as may present multiple surfaces and multiple symbols 412, 414 of the differently sized objects 402, 404 as being simultaneously in focus.

In some embodiments, adjustment of the current focal plane can be based on adjustments of a controllable mirror, including for mirror adjustments that change an optical path length, as also discussed above. For example, control of a mirror 416 can be used to determine appropriate focus adjustments for image capture at the different focal planes 408 as the objects 402, 404 are moved, as well as to maintain the objects 402, 404 within a FOV of the imaging device 400. For example, as similarly discussed above, once a reference focus adjustment has been determined (e.g., for one or more of the focal planes 408) adjustments to maintain the reference focus, or to predictably vary a current focus from the reference focus, can be determined. For example, as also discussed above, focus adjustments can be determined based on adjustments of the orientation of the mirror 416, which can indicate, via the application of known trigonometric principles, a current length of an optical path 418.

As with other embodiments discussed herein, these focus-related applications can also be implemented in combination with other approaches. For example, a distance measuring device or operations based on manipulation of a controllable mirror (e.g., as described relative to FIG. 6) can be used to determine a particular height of one or both of the objects 402, 404, which may be used to refine or otherwise further adjust the focus of the imaging device 400 for imaging of the objects 402, 404.

Some embodiments of the technology can be used to implement other set-up or run-time calibration or other adjustments beyond those expressly discussed above. Additional examples in this regard are presented below, each of which can be operated alone or in conjunction with one or more of the other disclosed approaches. Generally, as detailed in various examples below, a mirror arrangement with at least one controllable mirror can be manipulated in order to efficiently implement set-up or runtime search operations or other similar tasks based on a variety of optimization criteria and other factors. This may be useful, for example, to identify a particular scan area to be covered during runtime operations, to find one or more symbols or objects within a particular scan area, or for other tasks.

Figure 15:
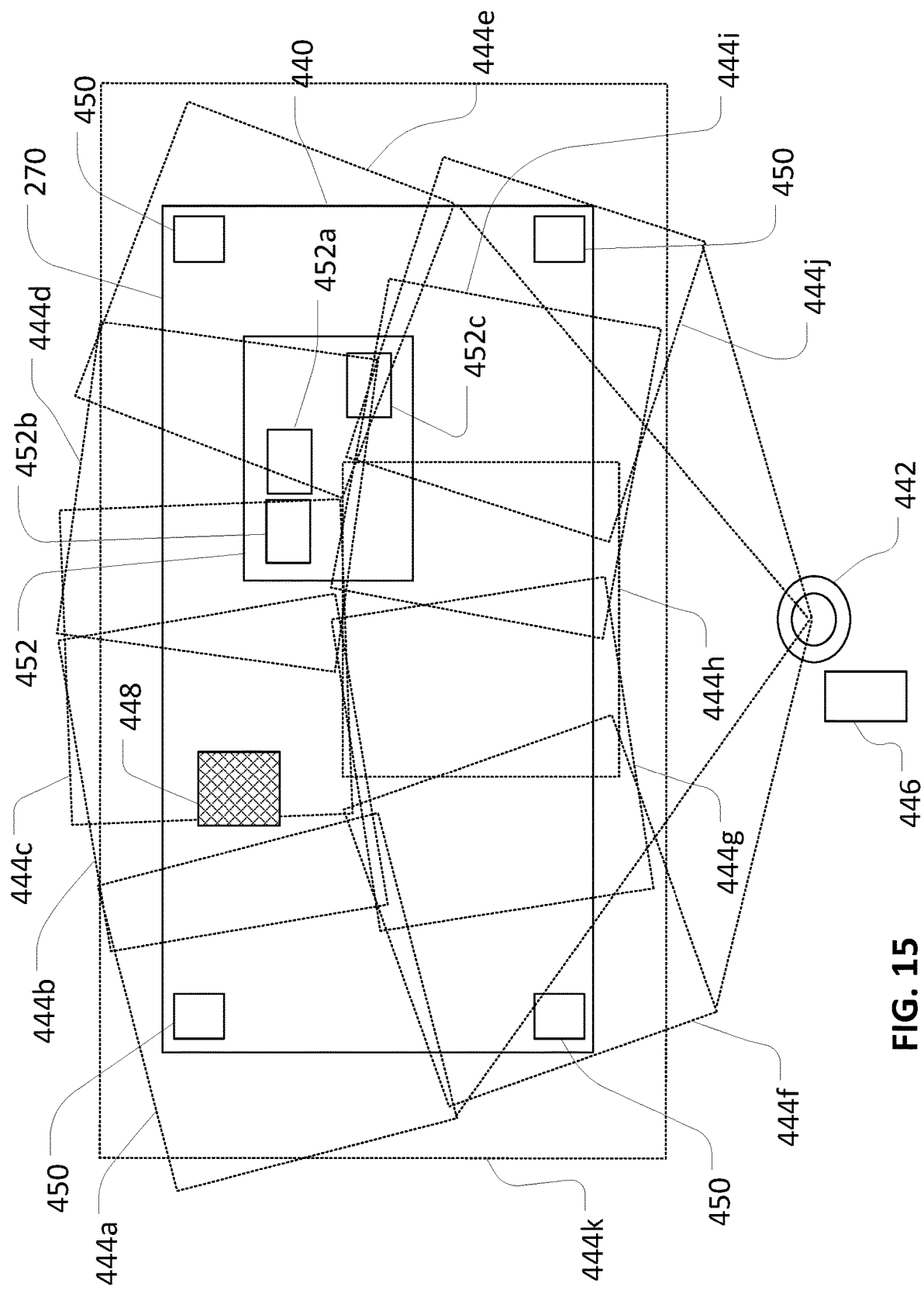
FIG. 15 is a schematic view of calibration and scan methods (and systems), in accordance with some embodiments of the technology.

In some embodiments, a user can manually identify a particular area to be scanned, such as by interacting with a user interface for machine vision software, and a mirror can then be controlled accordingly for a set of image acquisitions. For example, as illustrated in FIG. 15, after a user has manually specified a scan (target) area 440, a two-axis mirror 442 can be controlled based on earlier calibration of mirror movement to a FOV location in order to capture one or more images using a set of FOVs 444a-444j that fully cover the scan area 440. In some embodiments, however, including as discussed below, only a subset of the FOVs 444a-444j may be used, so that at least one imaging cycle may not necessarily cover every part of the scan area 440.

In some embodiments, a user can specify a scan area via management software for a relevant imaging device (not shown in FIG. 15) or machine vision system, along with other relevant information as appropriate. For example, in addition to a designated scan area, a user may specify information such as parameters for a currently-attached lens assembly, a distance from the imaging device to a focal plane of the scan area, whether a particular multiple-mirror (e.g., fixed-mirror) assembly is to be used (e.g., to provide a particular optical path length), real-world dimensions of the desired FOV, whether and by how much adjacent FOVs should overlap, and so on. In this regard, for example, a user may specify the location and size of the scan area 440, a distance from the imaging device to the scan area 440, and a desired degree of overlap of adjacent images, and the mirror 442 can then be automatically controlled to acquire images of the entire scan area 440.

In some embodiments, certain parameters can be determined automatically. For example, a controllable mirror arrangement or distance measurement device can be used to determine a distance to a scan area, and associated information can be derived therefrom, including real-world dimensions of the scan area. For example, a time-of-flight measurement device 446 (or other device, such as a 3D sensor) can be configured to determine a distance between the scan area 440 and the imaging device (not shown) and the mirror 442 can then be controlled accordingly (e.g., using known trigonometric principles) to allow images to be acquired for a relevant set of the FOVs 444a-444j. Similarly, for large scan areas, it may be necessary to adjust focus for certain FOVs (e.g., the exterior FOVs 444a, e, f, j). In some cases, this adjustment can be made automatically, including based on analysis of the movement of a controllable mirror as discussed above.

As another example, a symbol 448 of known type and dimensions can be provided within the scan area 440. An image can be acquired of the symbol 448 (e.g., via the FOV 444c as a default starting FOV) and a correlation between image dimensions (i.e., pixels) and real-world dimensions (e.g., mm) can then be determined using known image analysis techniques. This correlation can then be used, again based on known trigonometric principles, to determine a distance between the symbol 448 and the imaging device, and the mirror 442 can be subsequently controlled accordingly, to provide one or more of the FOVs 444a-444j.

In some embodiments, other analysis of symbols can otherwise help to determine a relevant scan area. In some embodiments, particular symbols may indicate key portions of a scan area, such as vertices or other boundaries that collectively specify part or all of the outer profile of the scan area. For example, as illustrated in FIG. 15, a set of symbols 450 have been disposed at the four corners of the rectangular scan area 440. When a setup (or other) operation is started, the mirror 442 can then be controlled in order to acquire images of (and around) the scan area 440, such as by successively capturing images of the FOVs 444a-444j in a particular (e.g., predetermined) order. From analysis of the images, the image location of the symbols 450 can be identified and, as needed, the real-world location of the symbols 450 can be determined (e.g., based on trigonometric analysis using the location within the FOVs 444a, e, f, j, a known or measured distance to the scan area 440, and the angular orientation of the mirror 442 during the relevant image acquisitions). The location of the scan area 440 can then be specified, whether in terms of angular orientations of the mirror 442 or real-world location, in order to guide subsequent (e.g., runtime) image acquisition.

In some implementations, searching a particular area for symbols can proceed in different optimized ways, including as may depend on particular parameters of the relevant image-acquisition and analysis devices. For example, in systems for which image acquisition may take a generally long time but image analysis may be relatively quick, image acquisition to search for symbols may sometimes be executed to minimize the number of images acquired. In contrast, in systems for which image acquisition may be relatively quick but image analysis may take a relatively long time, image acquisition to search for symbols may sometimes be executed to minimize the expected time to find all symbols. Examples of optimization approaches that may address either of these priorities are further discussed below.

In some cases, images may initially be acquired for FOVs that correspond to real-world locations where a particular symbol may be expected to be found. Expected locations for symbols can include, for example, locations that are readily within reach of typical users, or that are within proximity to (or sufficiently removed from) particular locations. For example, initial image acquisition may concentrate on locations at particular physical locations in which it is likely that a user may have placed a symbol or object, such as at locations around (e.g., within a threshold distance from) particular heights corresponding to a height or each of a user, or around particular distances (e.g., within a threshold distance) from a reference point, such as the edge of a conveyor, staging area, or imaging area. In this regard, for example, with the scan area 440 considered as extending vertically and the top of the scan area 440 being around chest height for a user (e.g., between 1-2 m above the ground or other user-support surface), initial image acquisition may proceed with the upper FOVs 444a-444e based on the expectation that a user is more likely to place symbols for identification of a scan area (or otherwise) at or near their own chest-height (e.g., between 1-2 m above the ground).

Similarly, if symbols are expected to be placed in the corners of a scan area and one or more of the boundaries of the scan area can be reasonably approximated, initial image acquisition may preferentially include expected locations of one or more corners (or other boundary points) of the scan area. For example, with a distance to the scan area 440 and an approximate size of the scan area 440 being known, the mirror 442 can be controlled to initially acquire images only using the corner FOVs 444*a, e, f, j*. If the symbols 450 can be identified in these images, the virtual (or real-world) location of the corners of the scan area 440 can then be specified to guide later control of the mirror 442 to acquire images of the entire scan area 440, and acquisition of further setup images (e.g., using the FOVs 444*b, c, d, f, h, i*) may not be necessary. In contrast, if no symbols can be identified in these images, further images can be acquired at the corner FOVs 444*a, e, f, j*, or other FOVs, including based on example rules for expanded searches as further detailed below.

In any case, once the boundaries of the scan area 440 have been specified, a map of FOV locations (or scope) corresponding to particular orientations of the mirror 442 can be determined accordingly, and can be used, during runtime or during further setup operations, to appropriately orient the mirror 442 for image acquisition using a particular FOV.

As another example, initial image acquisition may concentrate on locations that previous user inputs or previous image analysis have suggested are high-likelihood areas for images. For example, when searching the scan area 440 for an object, initial image acquisition may preferentially employ FOVs in which a similar object (or relevant symbol) was previously found. For example, in a presentation scanning application, if analysis of previously acquired images indicates that an object is likely to be presented in one or more particular locations in a scan area, initial image acquisition may employ only FOVs that cover those locations. For example, if analysis of previous images indicate that a group of users (or one user in particular) tend to present objects within the scan area 440 at a location similar to that shown for the object 452 (see FIG. 15), initial image acquisition to find a subsequent object (or symbol) may preferentially employ the FOVs 444*d, e, i, j* (e.g., the FOVs within which the object 452 was previously successfully imaged). Similarly, if corner locations for a scan area were previously successfully identified using the FOVs 444*a, e, f, j*, initial scans to identify the boundaries of the scan area 440 may preferentially use only one or more of those FOVs.

In some embodiments, a degree of overlap can be specified in order to optimize searches for symbols or objects, or identification of a scan area, including by specifying a binary degree of overlap (i.e., YES or NO to overlapping images) or by specifying a non-binary degree of overlap (e.g., one or more percentages of overlap for adjacent images in one or more directions). Thus, in some cases, in order to reduce the number of images acquired when searching for an object or symbol over a search area, images covering the search area may initially be acquired with a relatively course non-overlapping search, i.e., with no or relatively minimal (e.g., 10% or less) overlap between adjacent FOVs.

For example, initial acquisition of images to specify the scan area 440 via identification of the symbols 450 or to locate the symbol 448 or the object 452 may initially proceed with non-overlapping FOVs 444*a, c, e, f, g, j*, with images of those FOVs being analyzed to search for the symbols 450 before additional images are acquired (or analyzed). In some cases, although this approach may not necessarily cover the entirety of the scan area 440 with the initial image acquisitions, appropriate setup (or runtime) information, such as the location of the object 452, the symbol 448, or the corner symbols 450—and thus the boundaries of the scan area 440—may nonetheless still be determined with relatively high efficiency. (As generally used herein relative to FOVs and images, "non-overlapping" refers to zero overlap, overlap that is less than 5% of a total dimension of the FOV or image in the overlapping dimension, or overlap that is less than 25% of a maximum dimension of a largest expected symbol.)

If further images are needed, additional images using one or more of the overlapping FOVs 444*b, d, g, i* can then be introduced as appropriate. In some cases, overlapping images can be acquired as a matter of course for an entire scan area, based on user input for initial scanning, after a failure of non-overlapping initial scans to provide sufficient information, or for other reasons. For example, after acquiring a set of non-overlapping images in sequence and if further information is needed (e.g., if a relevant symbol or object has not been found), a search operation may proceed to fully cover the relevant scan area with a set of overlapping images that, along with the initially-acquired non-overlapping images, provide appropriately increased (e.g., complete) coverage of the relevant scan area. In this regard, for example, the initial non-overlapping images can facilitate a rapid, initial course search and the subsequent overlapping images can facilitate a somewhat slower, subsequent fine search. (Similar "course" and "fine" approaches can also be adopted relative to FOV size, as also discussed below.)

In some cases, only select overlapping images may be acquired as part of a fine (or other) search, including as based on information from initial non-overlapping (or other) course-search image acquisition. For example, machine vision analysis of the non-overlapping images 444*c, e, h, j* (e.g., edge finding, symbol identification, etc.) may indicate a likely position of the object 452 within the scan area 440, while also indicating that certain symbols, such as a symbol 452*a* on the object 452, have not been fully captured by the acquired images. Accordingly, a subsequent round of image acquisition may utilize the overlapping FOV 444*d*, in order to supplement the non-overlapping FOVs 444*c, e, h, j*, for a more complete imaging and analysis of the symbols on the object 452. On the other hand, if no partial feature of interest has been identified in the initial non-overlapping search, a subsequent overlapping search may proceed in ordinary course (e.g., sequentially in space for an entire scan area or portion thereof, as discussed above).

In some embodiments, use of overlapping FOVs to succeed an initial acquisition (and analysis) of non-overlapping FOVs may proceed using predetermined scan patterns. For example, after acquiring images in sequence for the FOVs 444*a, c, e, f, h, j* and upon identification of a need for further images, a subsequent round of image acquisition may proceed sequentially through the FOVs 444*i, g, d, b*. (In other embodiments, other sequences of acquisitions of non-overlapping or overlapping images are also possible.) In some embodiments, as also discussed below, use of overlapping FOVs can be guided by analysis of images from previously imaged (e.g., non-overlapping) FOVs. For example, upon identifying that the symbol 448 or another potential feature of interest is partially captured by the FOV 444*c* but extends somewhat to the left thereof, a subsequent overlapping round of scanning may begin with the FOV 444*b* or other proximate (e.g., adjacent) FOV that has been selected based on a high likelihood of that FOV helping to more fully capture the partially imaged feature of interest.

In some embodiments, whether initial (or other) image acquisition uses overlapping FOVs or the amount by which FOVs overlap can be determined based on user input, or based on other factors. In some embodiments, a degree of overlap for a particular search (or part thereof) may be determined based on the size of a symbol relative to the size of a FOV. For example, if a smallest expected size for a set of symbols to be found forms a relatively small proportion (e.g., 10% or less) of a FOV, it may be expected that the likelihood of the symbol being only partially imaged by any given FOV may be relatively small. Accordingly, it may be efficient to initially look for the symbols with no overlap between FOVs or with a FOV that corresponds to the proportional size of the symbol in the FOV (e.g., overlap of 10% or less) and to proceed to acquisition or analysis of overlapping FOVs only if the initial search is unsuccessful.

In some embodiments, a size of a FOV can be controlled via controllable mirrors (or otherwise) in order to optimize searching. For example, as discussed above, some systems can include mirrors that are controllable to provide imaging of the same or different scan areas with different sizes of FOVs (see, e.g., FIGS. 4A-5B). In some cases, an initial search for a symbol or object, such as to find the object 452 or to specify the boundaries or size of the scan area 440, may proceed with a first controllable mirror arrangement (e.g., including the mirror 442) that provides a relatively large FOV 444$k$. Once a relevant symbol or object has been located (e.g., the symbols 450, the symbol 448, or the object 452), a second controllable mirror arrangement (e.g., also including the mirror 442) can be used in order to acquire images using one or more of the smaller FOVs 444$a$-$j$.

In some embodiments, predetermined arrangements of particular symbols can be used to determine a relevant FOV for an image acquisition or analysis. For example, if an arrangement illustrated by symbols 452$a$-$c$ on the object 452 is a typical (e.g., standardized) arrangement, an identified location of one of the symbols 452$a$-$c$ may indicate a likely relative (or absolute) location of the other symbols 452$a$-$c$, whether considered in isolation or in combination with information about the object 452 (e.g., edge locations). Accordingly, in some cases, if an initial acquisition of an image using the FOV 444$c$ allows a location of the symbol 452$b$ to be determined, likely locations for the symbols 452$a$, 452$c$ may sometimes also be determined on that basis. A subsequent image acquisition may then beneficially proceed by controlling the mirror 442 to provide a FOV relevant to the determined symbol locations, such as by providing an adjacent, potentially overlapping FOV (e.g., the FOV 444$d$, $e$, or $j$) or an intermediary FOV (not shown) that is shifted relative to the FOV 444$c$ by an appropriate amount.

Similarly, if a predetermined target number of symbols has been identified, further image acquisition for a search operation may not be required. For example, if initial image acquisition to specify the scan area 440 has identified the four corner symbols 450, it may not be necessary to proceed with subsequent image acquisition for set up, and runtime operations can proceed based on the specified scan area 440. Similarly, if all three of the symbols 452$a$, $b$, $c$ have been identified and no further symbols are expected (e.g., based on a standardized symbol arrangement for the object 452), subsequent image acquisition may not be needed—at least as concerns finding further symbols on the object 452.

In this and other approaches, other types of analysis may also provide useful information to guide control of a mirror for image acquisition. For example, in some embodiments information from 3D scanning may be used in order to determine optimal FOVs for image acquisition. As another example, known types of machine vision analysis, such as identification of whole or partial symbols, of object faces or edges, and so on, can also help to guide identification of appropriate FOVs and, correspondingly, appropriate adjustment of a controllable mirror, including as alluded to above. These and similar types of information may also be useful, for example, in order to help identify what types of adjustments to a mirror may be needed in order to provide a particular FOV.

Although particular systems and corresponding methods are presented individually above, aspects of any number of the disclosed embodiments can be combined or interchanged with each other in some implementations. For example, the principles of mirror control and image acquisition presented relative to FIGS. 1A through 3 can generally be used to implement the zooming, dimensioning, focusing, selective imaging, and other functionality discussed with regard to FIGS. 4A through 15. Similarly, trigonometric analysis as described relative to FIG. 6 and known variations thereupon (e.g., with certain initially unknown quantities in FIG. 6 being otherwise determined) can be applied in a variety of contexts, including with respect to some variations of each of the other embodiments discussed above. Further, other aspects can also be combined or interchanged. For example, configurations with three or more mirrors along particular optical paths (e.g., as shown in FIG. 5A) can be used in, or used to implement similar functionality as, any number of other systems presented herein as having only two mirrors along particular optical paths. Indeed, in general, additional fixed or controllable mirrors can be added to any of the optical paths discussed herein, with results following according to the principles disclosed above, although this may increase complexity in various ways. Additionally, in some implementations, mirrors that are discussed expressly above as being fixed mirrors can be replaced with controllable mirrors, such as remotely installed secondary controllable mirrors that may be controlled synchronously with primary controllable mirrors included in imaging devices.

Generally, systems and methods disclosed herein can also be optimized in various ways. For example, scan patterns and image acquisition using controllable mirrors, including those discussed relative to embodiments illustrated in the FIGS. can be optimized based on considerations relating to minimizing the number of total scans, movements, or images acquired, minimizing the equipment and other overhead required to acquire appropriate images for a complete scan area or scanning goal, and minimizing the perspective distortion of images of objects of interest (e.g., due to relatively large angle of incidence for optical paths). However, in some implementations, depending on available equipment, context, objectives, types of objects to be scanned, and other factors, certain of these considerations (or others) may be prioritized, as appropriate.

The particular embodiments disclosed above are illustrative only, as the technology may be modified and practiced in different but equivalent manners apparent to those skilled in the art having the benefit of the teachings herein. Further, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. An imaging system comprising:
an imaging sensor;

a lens arrangement;
a mirror that is controllably movable about at least two axes; and
one or more control devices that are configured to:
identify a scan area to be scanned that includes at least a first part of a side of an object;
determine a plurality of field of view (FOV) locations corresponding to a plurality of fields of view (FOVs) that collectively span at least part of the scan area; and
acquire a plurality of images of at least the first part of the side of the object using the imaging sensor, wherein acquiring the plurality of images includes:
moving the mirror to move a FOV of the imaging system to each of the plurality of FOV locations according to a predetermined order of image acquisition; and
acquiring an image at each of the plurality of FOV locations.

2. The imaging system of claim 1, wherein the imaging sensor is configured to be stationary relative to the object to acquire the plurality of images.

3. The imaging system of claim 1, wherein the one or more control devices are further configured to:
receive a user input that specifies the scan area; and
define the scan area based on the user input.

4. The imaging system of claim 3, wherein the scan area is defined to not include at least a second part of the side of the object.

5. The imaging system of claim 1, wherein the one or more control devices are further configured to determine a minimum overlap between at least two adjacent FOVs of the plurality of FOVs, based on identifying an expected maximum dimension for a symbol on the object.

6. The imaging system of claim 1, wherein the one or more control devices are configured to stitch the plurality of images together to provide a composite image of at least the first part of the side of the object.

7. The imaging system of claim 6, wherein the imaging system is configured to acquire a plurality of images for each of a plurality of sides of the object and to provide a composite image of the plurality of sides of the object.

8. The imaging system of claim 1, wherein the side of the object is a top side of the object; and
wherein the scan area spans an entire width of a conveyor that supports the object.

9. The imaging system of claim 1, wherein the plurality of FOVs collectively span the entirety of the side of the object.

10. The imaging system of claim 1, wherein the plurality of FOVs collectively span the entirety of the scan area.

11. The imaging system of claim 1, further comprising a distance sensor, wherein the one or more control devices are further configured to identify a distance from the imaging sensor to the scan area using the distance sensor.

12. The imaging system of claim 11, wherein the distance sensor comprises a time-of-flight sensor that that directs a pulse onto the side of the object via the mirror and receives a reflection of the pulse via the mirror.

13. The imaging system of claim 1, wherein identifying the scan area is based on at least one of: a parameter of the lens arrangement, a distance from the imaging sensor to the scan area, a real-world dimension of a desired FOV, or a desired degree of an overlap between adjacent FOVs.

14. The imaging system of claim 1, wherein the first part of the side of the object includes a set of one or more symbols; and
wherein the one or more control devices are further configured to
perform a machine vision analysis to identify a symbol of the set within the plurality of images and determine whether the identified symbol is a full symbol or a partial symbol; and
initiate a subsequent image acquisition for the object based on determining that the identified symbol is a partial symbol.

15. The imaging system of claim 1, wherein the one or more control devices are further configured to:
determine a number of symbols identified within the plurality of images; and
if the number of symbols identified is smaller than a predetermined number of symbols, initiate subsequent image acquisition for the object.

16. The imaging system of claim 1, wherein the one or more control devices are configured to determine a FOV location of the plurality of FOV locations based on a predetermined symbol location.

17. The imaging system of claim 16, wherein the one or more control devices are further configured to determine the predetermined symbol location based on identifying a symbol in a preceding acquisition, by the imaging system, of a preceding image at a preceding FOV location.

18. A control system for an imaging system that includes an imaging sensor and a mirror that is controllably movable to direct a field of view (FOV) of the imaging system, the control system comprising one or more control devices that are configured to:
determine a first plurality of FOV locations on a side of an object corresponding to a first plurality of FOVs of the imaging system;
acquire a first plurality of images of the side of the object, wherein acquiring the first plurality of images includes:
moving the mirror to successively move a FOV of the imaging system to first FOV locations of the first plurality of FOV locations according to a determined first order of image acquisition; and
using the imaging sensor, acquiring an image at each of the first FOV locations;
attempt to identify one or more symbols in the first plurality of images; and
based on the attempt to identify the one or more symbols, moving the mirror to acquire a second plurality of images of the side of the object using the imaging sensor.

19. The control system of claim 18, wherein acquiring the second plurality of images of the side of the object includes:
determining a second plurality of FOV locations corresponding to a second plurality of FOVs of the side of the object; and
moving the mirror to successively move the FOV of the imaging system to second FOV locations of the second plurality of FOV locations according to a determined second order of image acquisition.

20. A method of scanning an object using an imaging system with an imaging sensor and a mirror, the method comprising:
identifying, a scan area to be scanned that includes a side of the object;
determining a plurality of field of view (FOV) locations corresponding to a plurality of fields of view (FOVs) that collectively span the scan area; and
acquiring a plurality of images of the side of the object via the imaging system, including:

moving the mirror to move a FOV of the imaging system to the plurality of FOV locations according to a predetermined order of image acquisition; and
acquiring an image at each of the plurality of FOV locations.

\* \* \* \* \*